US010583854B2

(12) United States Patent
Fleming et al.

(10) Patent No.: US 10,583,854 B2
(45) Date of Patent: Mar. 10, 2020

(54) ROTATING HANDLE DYNAMIC BRAKE

(71) Applicant: Thule Canada Inc., Granby (CA)

(72) Inventors: Wesley Fleming, Calgary (CA); Roger Mcpherson, Calgary (CA); Karl Mendes, Calgary (CA)

(73) Assignee: Thule Canada Inc., Granby (CA)

( * ) Notice: Subject to any disclaimer, the term of this patent is extended or adjusted under 35 U.S.C. 154(b) by 0 days.

(21) Appl. No.: 16/366,418

(22) Filed: Mar. 27, 2019

(65) Prior Publication Data

US 2019/0217880 A1  Jul. 18, 2019

Related U.S. Application Data

(63) Continuation of application No. 15/605,666, filed on May 25, 2017, now Pat. No. 10,279,832.

(60) Provisional application No. 62/444,661, filed on Jan. 10, 2017, provisional application No. 62/343,571, filed on May 31, 2016.

(51) Int. Cl.
*B62B 9/08* (2006.01)
*B60T 11/04* (2006.01)
*B62B 7/04* (2006.01)
*B62B 9/20* (2006.01)
*B62B 5/04* (2006.01)
*B62B 5/06* (2006.01)

(52) U.S. Cl.
CPC ............ *B62B 9/085* (2013.01); *B60T 11/046* (2013.01); *B62B 7/04* (2013.01); *B62B 9/087* (2013.01); *B62B 9/20* (2013.01); *B62B 5/0438* (2013.01); *B62B 5/066* (2013.01)

(58) Field of Classification Search
CPC ......... B62B 9/082; B62B 9/085; B62B 9/087; B62B 9/20; B62B 7/04; B62B 5/0442
USPC ....... 188/1.12, 2 D, 2 F, 19, 20, 77 R, 77 W; 267/5; 280/33.994, 47.24, 47.34, 47.38, 280/47.41
See application file for complete search history.

(56) References Cited

U.S. PATENT DOCUMENTS

| 5,370,408 A * | 12/1994 | Eagan ................... B62B 9/085 188/20 |
| 6,561,537 B1 * | 5/2003 | Chen .................. A63B 69/0028 188/20 |
| 7,523,954 B2 * | 4/2009 | Dotsey ...................... B62B 7/08 280/47.38 |
| 9,254,858 B2 * | 2/2016 | Shellenberger ......... B62B 9/087 |
| 10,279,832 B2 * | 5/2019 | Fleming ................ B60T 11/046 |
| 2004/0222607 A1 * | 11/2004 | Myers ....................... B62B 7/06 280/47.38 |

(Continued)

FOREIGN PATENT DOCUMENTS

| CH | 262695 A | 7/1949 |
| DE | 29914256 U1 | 12/1999 |
| DE | 20203348 U1 | 8/2002 |

*Primary Examiner* — Christopher P Schwartz
(74) *Attorney, Agent, or Firm* — Sterne, Kessler, Goldstein & Fox P.L.L.C.

(57) ABSTRACT

A child transport carrier includes a handle bar and a rotatable brake actuator disposed around the handle bar. The rotatable brake actuator includes a first portion having a first radius of curvature and a second portion having a second radius of curvature. The first radius of curvature is less than the second radius of curvature. Rotating the rotatable brake actuator around the handle bar activates a first wheel brake.

20 Claims, 22 Drawing Sheets

(56) References Cited

U.S. PATENT DOCUMENTS

| | | | |
|---|---|---|---|
| 2007/0251770 A1* | 11/2007 | Hargroder | A61G 5/1024 188/31 |
| 2008/0029982 A1* | 2/2008 | Dotsey | B60B 33/0002 280/47.38 |
| 2011/0298198 A1 | 12/2011 | Minato et al. | |

* cited by examiner

ROTATING HANDLE DYNAMIC BRAKE

CROSS REFERENCE TO RELATED APPLICATIONS

This application is a continuation of U.S. application Ser. No. 15/605,666, filed May 25, 2017, which claims priority to U.S. Provisional Application No. 62/444,661, filed Jan. 10, 2017, and U.S. Provisional Application No. 62/343,571, filed May 31, 2016, which are hereby incorporated herein in their entirety by reference.

BACKGROUND

Field

The present disclosure relates to passenger transport carriers. More specifically, embodiments of the present disclosure relate to rotating handles for brakes of passenger transport carriers, such as strollers.

Background

Passenger transport carriers carry a passenger, for example, a child, from one place to another. The transport carrier can have wheels with a braking system that can be operated by the user. The braking system can stop or slow the travelling motion of the carrier.

BRIEF SUMMARY

In some embodiments, a passenger transport carrier, for example, a child transport carrier, can include a handle bar and a rotatable brake actuator disposed about a lengthwise axis of the handle bar. One or more cable can be coupled to the rotatable brake actuator. The cable(s) can have a first end and a second end. In some embodiments, a first wheel brake can be coupled to the first end of the cable and a second wheel brake can be coupled to the second end of the cable. In some embodiments, a first end of the cable can be coupled to the first wheel brake and the second of the cable can be coupled to the rotatable brake actuator. In some embodiments, rotating the rotatable brake actuator about the lengthwise axis of the handle bar can activate the first wheel brake and the second wheel brake. In some embodiments, rotating the rotatable brake actuator about the lengthwise axis of the handle bar can simultaneously activate the first wheel brake and the second wheel brake.

In some embodiments, the rotatable brake actuator can be disposed at a midpoint of the handle bar. In some embodiments, the rotatable brake actuator can be configured to rotate in a direction toward a user positioned longitudinally rearward of the handle bar. In some embodiments, the rotatable brake actuator can be configured to rotate in a direction away from a user positioned longitudinally rearward of the handle bar. In some embodiments, the cable can be disposed through a housing of the rotatable brake actuator. In some embodiments, the cable can be coupled to an interior surface of the housing.

In some embodiments, a child transport carrier can include a frame, a first wheel coupled to the frame having a first brake, a second wheel coupled to the frame having a second brake, and a handle bar coupled to the frame. In some embodiments, a rotatable brake actuator can be disposed about the handle bar. In some embodiments, the brake actuator can include a base member having an elongate tubular body disposed coaxially about the handle bar. In some embodiments, the base member can include a first collar disposed at a first end of the body and having a first passage therethrough, and a second collar disposed at a second end of the body and having a second passage therethrough. In some embodiments, a housing can be disposed about the body of the base member and the brake actuator can include a cavity extending through the housing from a first end of the housing to a second end of the housing. In some embodiments, the carrier can include a cable extending from the first brake to the second brake and passing through the first passage of the first collar, the cavity of the housing, and the second passage of the second collar. In some embodiments, rotating the brake actuator can displace the cable, thereby actuating the first and second brakes.

In some embodiments, a ledge can be disposed within the cavity of the housing. In some embodiments, the cable can extend over an upper surface of the ledge. In some embodiments, the upper surface of the ledge can include a notch. In some embodiments, the cable can be disposed in the notch. In some embodiments, the cable can be disposed through a hole in the ledge.

In some embodiments, the first collar can include a first protrusion (e.g., a nipple) extending from the first collar. The first protrusion can define an outer opening of the first passage. In some embodiments, the second collar can include a second protrusion extending from the second collar. The second protrusion (e.g., a nipple) can define an outer opening of the second passage. In some embodiments, each of the first collar and second collar can have an inner opening facing the body of the base member.

In some embodiments, the housing can include at least one gripping area on an outer surface of the housing. In some embodiments, the gripping area can have at least one ridge extending from the outer surface. In some embodiments, the gripping area can have two, three, or more than three ridges.

In some embodiments, the housing can include a through-hole having an inner surface configured to be disposed about an outer surface of the body of the base member. In some embodiments, the inner surface of the through-hole can contact the outer surface of the body of the base member around an entirety of the body. In some embodiments, the housing can include a wall disposed between the through-hole and the cavity.

In some embodiments, a rotatable braking actuator for a child transport carrier can include a base member having an elongate tubular body with a longitudinal axis of rotation, a first collar disposed at a first end of the body and having a first passage therethrough, and a second collar disposed at a second end of the body and having a second passage therethrough. In some embodiments, a housing can be disposed about the body of the base member and coupled to the base member. In some embodiments, the housing can include a cavity extending through the housing from a first end of the housing to a second end of the housing. In some embodiments, a cable can extend through the first passage of the first collar, the cavity of the housing, and the second passage of the second collar.

In some embodiments, the housing and the base member can be configured to simultaneously rotate about the longitudinal axis of rotation. In some embodiments, the housing can rotate about the longitudinal axis of rotation and the base member can remain fixed in place. In some embodiments, the first and second passage can each have an interior opening facing the body of the base member. In some embodiments, a distance between the interior openings can be between 85 mm and 225 mm. In some embodiments, the distance between the interior openings can be between 110 mm and 150 mm. In some embodiments, the distance between the interior openings can be between 120 mm and 140 mm. In some embodiments, the distance between the interior openings can be between 125 mm and 135 mm. In some embodiments, the distance between the interior openings can be about 130 mm.

In some embodiments, a perpendicular distance from the longitudinal axis of rotation to the cable(s) within the cavity can be between 10 mm and 50 mm. In some embodiments, the perpendicular distance from the longitudinal axis of rotation to the cable within the cavity can be between 20 mm and 30 mm. In some embodiments, the perpendicular distance from the longitudinal axis of rotation to the cable can be between 22 mm and 28 mm. In some embodiments, the perpendicular distance from the longitudinal axis of rotation to the cable(s) can be between 24 mm and 26 mm. In some embodiments, the perpendicular distance from the longitudinal axis of rotation to the cable(s) can be about 25 mm.

In some embodiments, a ledge having a notch can be disposed within the cavity of the housing. In some embodiments, the cable can be disposed in the notch.

In some embodiments, a first axis can extending through the longitudinal axis of rotation and the first passage and a second axis extend through the longitudinal axis of rotation and the notch. In some embodiments, an angle between the first axis and the second axis can be between 5 and 30 degrees when the braking device is in a starting position (i.e., not rotated). In some embodiments, the angle between the first axis and the second axis can be between 10 and 25 degrees when the braking device is in the starting position. In some embodiments, the angle between the first axis and the second axis can be between 15 and 20 degrees when the braking device is in the starting position. In some embodiments, the angle between the first axis and the second axis can be between 17 and 19 degrees when the braking device is in the starting position. In some embodiments, the angle between the first axis and the second axis can be about 18 degrees when the braking device is in the starting position.

In some embodiments, the base member and/or the housing can be configured to rotate between 25 and 125 degrees from the starting position to an ending position. In some embodiments, the base member and/or the housing can be configured to rotate between 30 and 60 degrees from the starting position to an ending position. In some embodiments, the base member and/or the housing can be configured to rotate between 35 and 55 degrees from the starting position to the ending position. In some embodiments, the base member and/or the housing can be configured to rotate between 40 and 50 degrees from the starting position to the ending position. In some embodiments, the base member and/or the housing can be configured to rotate between 44 and 46 degrees from the starting position to the ending position. In some embodiments, the base member and/or the housing can be configured to rotate about 45 degrees from the starting position to the ending position.

In some embodiments, a method of activating a braking system of a child transport carrier can include rotating a braking actuator about a handle bar of the carrier. In some embodiments, the braking actuator can include a base member having an elongate tubular body disposed around the handle bar, a first collar disposed at a first end of the body and having a first passage therethrough, and a second collar disposed at a second end of the body and having a second passage therethrough. In some embodiments, the braking actuator can include a housing disposed about and coupled to the base member. In some embodiments, the housing can have a cavity extending through the housing from a first end of the housing to a second end of the housing. In some embodiments, rotating the braking actuator can displace a cable disposed through the first passage, the cavity, and the second passage from a first position to a second position, thereby imparting force along the cable to activate a first and second brake of respective first and second wheels disposed on opposite sides of the carrier. In some embodiments, rotating the braking actuator can displace a cable disposed through the first passage and coupled to the housing, thereby imparting force along the cable to activate a first brake of a first wheel of the carrier. In some embodiments, rotating the braking actuator can displace a first and second cable coupled to the housing and to respective first and second brakes, thereby imparting force along the cables to activate the first and second brake of respective first and second wheels.

In some embodiments, a child transport carrier can include a handle bar and a rotatable brake actuator disposed along a lengthwise axis of the handle bar. A first cable can be coupled to the rotatable brake actuator. The first cable can have a first end and a second end. In some embodiments, a first wheel brake of a first wheel can be coupled to the first end of the first cable. In some embodiments, rotating the rotatable brake actuator around the lengthwise axis of the handle bar can activate the first wheel brake.

In some embodiments, rotating the rotatable brake actuator can wrap the first cable in both circumferential and lengthwise directions. In some embodiments, the first cable can wrap around an outer surface of a base member disposed inside a housing of the rotatable brake actuator. In some embodiments, rotating the rotatable brake actuator can impart a force perpendicular to a lengthwise direction of the first cable.

In some embodiments, the second end of the first cable can be coupled to an interior of a housing of the rotatable brake actuator. In some embodiments, the second end of the first cable can be fixedly attached to the interior of the housing of the rotatable brake actuator.

In some embodiments, the carrier can include a second cable having a first end and a second end. A second wheel brake of a second wheel can be coupled to the first end of the second cable. Rotating the rotatable brake actuator around the lengthwise axis of the handle bar can activate the second wheel brake. In some embodiments, rotating the rotatable brake actuator around the lengthwise axis of the handle bar can simultaneously activate the first wheel brake and the second wheel brake. In some embodiments, increasing the rotation of the rotatable brake actuator around the handle bar can increase a braking force applied to the first and/or second wheel brake.

In some embodiments, the rotatable brake actuator can include a base member having a main body disposed around the handle bar. In some embodiments, a first collar can be disposed at a first end of the main body having a first passage through the first collar. In some embodiments, a housing can be disposed around the main body of the base member defining an interior cavity. In some embodiments, the first cable can be disposed through the first passage of the first collar and coupled to the housing within the interior cavity. In some embodiments, the first cable can enter the first passage at an angle between 10 and 70 degrees relative to an exterior surface of the first collar. In some embodiments, the first cable can enter the first passage at an angle of about 15 degrees relative to the exterior surface of the first collar. In some embodiments, the first cable can enter the first passage at an angle of about 60 degrees relative to the exterior surface of the first collar.

In some embodiments, a child transport carrier can include a handle bar and a brake actuator configured to couple to the handle bar and rotate around the handle bar. In some embodiments, the brake actuator can include a housing having a first portion and a second portion configured to couple to the first portion around the handle bar. In some embodiments, the first portion and the second portion of the housing can be coupled by screws or snap-fit. In some embodiments, a first cable having a first end can be coupled to a first wheel brake and a second end can be coupled to the housing. In some embodiments, rotating the brake actuator around the handle bar can activate the first wheel brake. In some embodiments, the second end of the first cable can be fixedly attached to an interior surface of the first portion of the housing.

In some embodiments, the carrier can include a second cable having a first end coupled to a second wheel brake and a second end coupled to the housing of the brake actuator. In some embodiments, rotating the brake actuator around the handle bar can activate the second wheel brake.

In some embodiments, the brake actuator can include a base member having a main body disposed around the handle bar. In some embodiments, the main body of the base member can be cylindrical. In some embodiments, a housing can be disposed around the main body of the base member, defining an interior cavity. In some embodiments, the base member of the brake actuator can include a first collar disposed at a first end of the main body. In some embodiments, the first collar can have a first nipple extending from the first collar and defining a first passage through the first collar. In some embodiments, the first cable can be disposed through the first passage. In some embodiments, a second collar can be disposed at a second end of the main body. In some embodiments, the second collar can have a second nipple extending from the second collar and defining a second passage through the second collar. In some embodiments, a second cable can be disposed through the second passage.

In some embodiments, an interior surface of the housing can include a plurality of curved ribs extending from the interior surface. In some embodiments, the ribs can be configured to contact an outer surface of the main body of the base member. In some embodiments, the housing can be configured to rotate around the base member. In some embodiments, the base member can include a stop member extending from an outer surface of the main body. In some embodiments, the stop member can be configured to engage at least one of the plurality of ribs, thereby limiting rotation of the brake actuator around the handle bar.

In some embodiments, a child transport carrier can include a handle bar having a central axis and a rotatable brake actuator disposed around the handle bar. In some embodiments, a first radius from the central axis to a first point on an outer surface of the rotatable brake actuator can be smaller than a second radius from the central axis to a second point on the outer surface of the rotatable brake actuator. In some embodiments, the first radius and the second radius can be collinear. In some embodiments, a first cable having a first end can be coupled to a first wheel brake and a second end can be coupled to the rotatable brake actuator. In some embodiments, rotating the rotatable brake actuator around the handle bar can activate the first wheel brake.

In some embodiments, the rotatable brake actuator can include a base member having a cylindrical main body disposed symmetrically around the central axis of the handle bar and a housing disposed around the main body. In some embodiments, a first collar can be disposed at a first end of the main body and having a first passage therethrough, and a second collar can be disposed at a second end of the main body and having a second passage therethrough. In some embodiments, the first collar and the second collar can have an oblong shape such that a first portion of the first and second collars has a smaller radius of curvature than a second portion of the first and second collars.

In some embodiments, the rotatable brake actuator can include at least one gripping area. In some embodiments, the gripping area can include at least one ridge extending from an outer surface of the rotatable brake actuator. In some embodiments, the first point of the rotatable brake actuator can be configured to be gripped by a palm of a user and the second point of the rotatable brake actuator can be configured to be gripped by one or more fingers of the user.

In some embodiments, the carrier can include a second cable having a first end coupled to a second wheel brake and a second end coupled to the rotatable brake actuator. In some embodiments, the second ends of the first and second cables can be fixedly attached to an interior of a housing of the rotatable brake actuator.

BRIEF DESCRIPTION OF THE DRAWINGS/FIGURES

The accompanying drawings, which are incorporated herein and form a part of the specification, illustrate the embodiments and, together with the description, further serve to explain the principles and to enable a person skilled in the relevant art(s) to make and use the embodiments.

Figure 1:
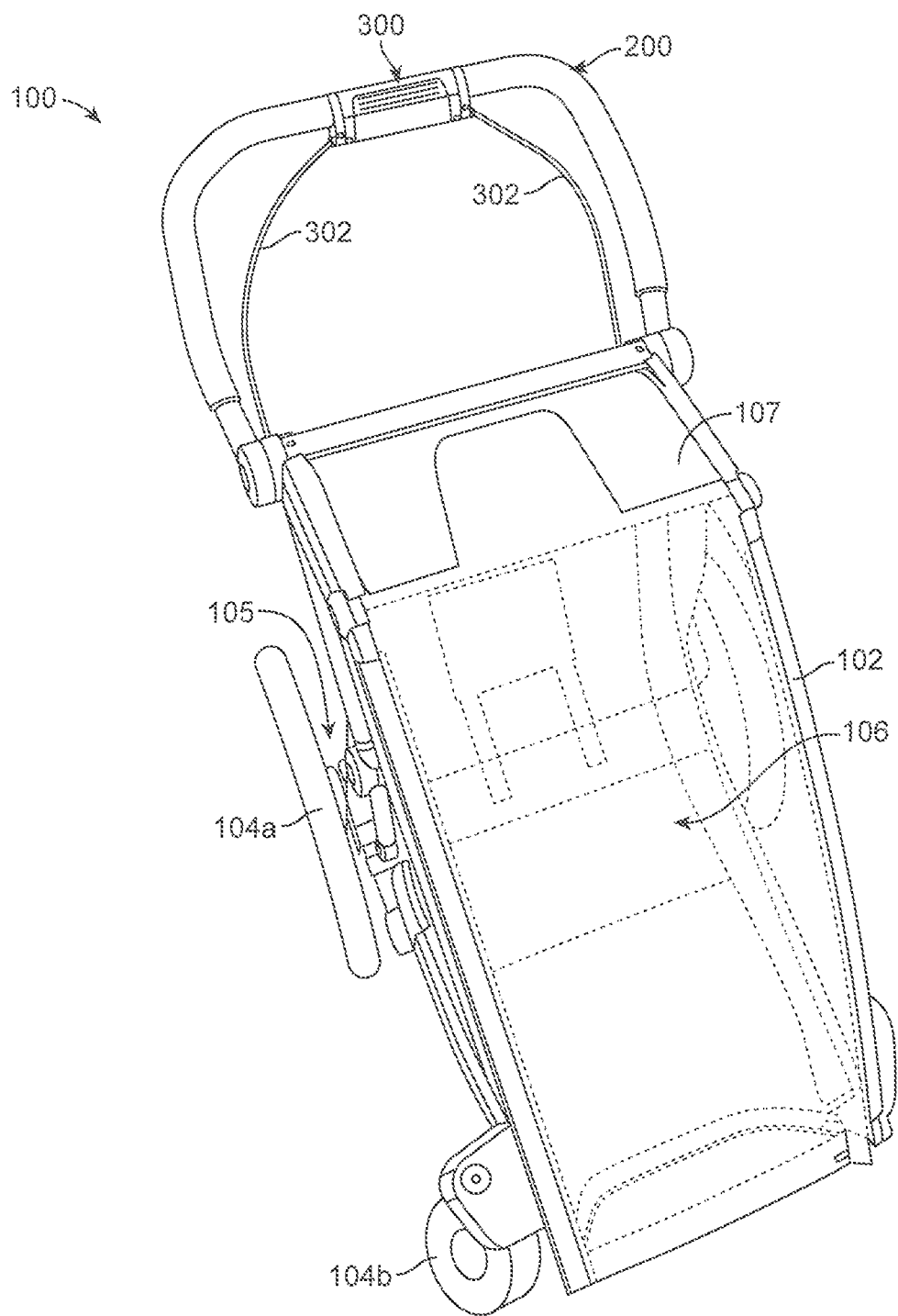
FIG. 1 illustrates a front perspective view of a passenger transport carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Braking systems are an important safety feature of transport carriers, for example, child transport carriers such as strollers. Without a braking system, it can be difficult to stop or slow the motion of the transport carrier, for example, on a decline or when travelling at a fast pace and needing to stop or slow quickly. Therefore, it is also important to have a braking actuator ergonomically disposed so that it can be easily activated by the user, for example, while walking or jogging.

It may also be advantageous to have a single braking actuator that is capable of activating two braking systems at the same time, for example, a braking system for each of two wheels disposed on opposite sides of the transport carrier. This can allow the user to use one hand to activate braking systems on both sides of the transport carrier, thereby evenly and quickly slowing or stopping the transport carrier. The rotational motion needed to actuate the brake as described herein is natural for the user and can be done without taking the fingers or hand off of the handlebar (e.g., as required when squeezing a lever), improving control and security. Moreover, embodiments of the braking systems described herein are "dynamic" in that they are not simply an "on/off" system. As the user rotates the braking actuator farther around the handle bar, more force is applied to the brakes.

The braking actuators described herein have mechanical advantages over conventional brake actuators, such as brake levers. A typical brake lever requires a pull force of about 180 N by the user to achieve a total of about 560 N (280 N per brake) of cable tension to create enough friction by the brake to stop the carrier. In some cases, this pull force is 90% of the maximum grip force for a user. Therefore, it is difficult for the user to sustain this force over longer or multiple braking situations.

Embodiments of the rotational brake actuators described herein require only about 3 Nm of torque to achieve the same 280 N of cable tension at each brake. This is facilitated, for example, by pulling the center of a single continuous cable. The required torque is about 30% of the maximum torque that can be applied by most users. Therefore, it is relatively easy to sustain this torque for longer or multiple braking situations than with a lever brake.

Furthermore, a typical pull lever must be pulled approximately 50 mm by the user in order to have the output cable travel about 20 mm. This distance can be difficult to manage for users with smaller hands or for a user's weaker hand. This can result in a dangerous situation where the user cannot fully lock up the wheels with the brakes. In comparison, embodiments of the rotational brake actuators described herein can be rotated about 45 degrees (about 13 mm on the circumference of the handle bar) in order to achieve the same output cable travel of about 20 mm. This motion is much easier for a user and can be done with either hand.

Embodiments of the brake actuators and braking systems disclosed herein are able to create larger braking (tension) forces with smaller input (rotational) forces, for example, by wrapping the cable(s) both around and along the circumference of the handle bar. Other cable braking systems rely solely on linear travel of the cable to actuate the braking system at the wheel. Embodiments herein are able to use leverage to apply a larger force and increase cable travel distance, while making it easier for the user to apply the brake force. Generally, as the radius about which the cable(s) wraps increases, a larger braking force is applied, making it easier to apply the brake force. However, a handle bar with too large of a radius may be difficult to grip for some users.

In embodiments where two separate cables are used, one for each of two braking systems, terminating an end of the cables at a fixed point on the brake actuator (e.g., within a housing of the brake actuator) can facilitate the wrapping effect around the handle bar. Using two cables can also simplify installation, particularly in after-market applications where the user is installing the braking system. One end of each cable can be attached at a respective brake, and the other end can be coupled to the brake actuator. This alleviates the need for routing the cable through the actuator or within the handle bar.

Another advantage of embodiments of the brake actuators described herein is the two-piece construction of both the housing and base member. This allows the brake actuator to be provided as an after-market component from the child carrier and attached to the handle bar by the consumer, adding to convenience and interchangeability from one product to another. The two-piece construction allows for easy assembly and routing of the cables from the brake systems and attachment to the brake actuator.

The shape of embodiments of the brake actuators also provides an ergonomic benefit. The non-circular shape of some embodiments provides a better grip to user and also provides space for the cables within the housing of the brake actuator. In some embodiments, a wider section away from the user allows the cable to remain internal within the brake actuator and protects the user's hands from an external cable, while a narrower section closer to the user comfortably fits within the palm of the user's hand.

Still further, when folding a transport carrier or rotating the handle bar to a non-use position, a traditional lever can press into the cover of the passenger compartment, risking damage to the cover. The rotational brake actuators described herein do not have this drawback, as they are disposed closely about the handle bar.

FIG. 1 illustrates carrier 100, according to an embodiment. Carrier 100 can be configured to carry, for example, a child, an elderly person, or a disabled person. In some embodiments, carrier 100 can be a stroller for a child. Carrier 100 can have one or more wheels 104, and preferably two or more wheels. In some embodiments carrier 100 can have one, two, three, four, or more than four wheels. As shown in FIG. 1, in some embodiments, carrier 100 can have two rear wheels 104a and two front wheels 104b. In some embodiments, the rear wheels 104a can be larger in diameter than the front wheels 104b. In some embodiments, a rear wheel 104a can be disposed on each of a left and right side of carrier 100. In some embodiments (not shown), carrier 100 can have one front wheel 104b disposed in the center of the front portion of carrier 100, for example, for use while jogging.

Carrier 100 can include frame 102. Frame 102 can be made from any suitable material, for example, metal, plastic, or composite. Frame 102 can define compartment 106, within which a passenger, for example, a child, can sit while carrier 100 is in use. In some embodiments, a cover 107 can be disposed on all or a portion of frame 102 to enclose compartment 106 completely or partially.

In some embodiments, one or more of the wheels 104 can include a brake or braking system 105. For example, in some embodiments, each of a left and right rear wheel 104 can have its own brake or braking system 105. In some embodiments, a brake actuator 300 can be disposed on or about handle bar 200 of carrier 100 for activating the braking system 105 at one or both of the wheels 104 (e.g., rear wheels 104a). In some embodiments, one or more cable 302 can be coupled with brake actuator 300 and one or both of the braking systems 105 of rear wheels 104a or front wheels 104b. In some embodiments, two cables 302 can be coupled with brake actuator 300, for example, one cable 302 for a wheel 104 on each side of carrier 100. The term "cable" as used herein is not meant to be limiting and is intended to include one or more string, wire, plurality of braided or woven wires (e.g. metal or nylon wires), cord, band, rope, or any other elongated member sufficient to connect, for example, the braking system 105 of first and second wheels 104 on opposite sides of carrier 100 through brake actuator 300 or to separately connect each braking system 105 with brake actuator 300.

In some embodiments, brake actuator 300 can be activated by rotating brake actuator 300 about handle bar 200 of carrier 100. In some embodiments, rotation of brake actuator 300 can displace cable(s) 302 to activate the brakes or braking systems 105 at wheels 104. For example, rotating brake actuator 300 toward the user can pull cable 302, placing an upward force at the first and second ends of cable 302 attached with the braking systems 105 at the wheels 104. In some embodiments, activation of brake actuator 300 can activate both braking systems 105 simultaneously. Braking systems 105 can be band brakes, disc brakes, rim brakes, drum brakes, or any other braking system known in the art to apply, for example, a frictional braking force to wheels 104. In some embodiments, the brake actuator 300 rotation can trigger an electric motor or hydraulic brake cylinders that increase braking power and reduce the input force at the brake actuator. In some embodiments, a wireless option can be used, where rotating the brake actuator 300 activates braking systems 105 at the wheels 104 by sending a wireless signal to the braking systems 105.

Different types of braking systems can require different amounts of force in order to operate the brakes. In the devices described herein, the braking actuators can be designed to enhance force output for certain types of braking systems, for example, by changing the angle of entry, amount of handle rotation, and/or distance of cable travel. By way of example, embodiments of band brakes and disc brakes are described.

In some embodiments, band brakes can be used in braking system 105. Generally, the force required to apply band brakes is greater than the force required to apply disc brakes to achieve the required braking power. Therefore, the entry angle $\theta_3$ (see FIG. 22) of the cable(s) 302 with respect to a side surface 407, 409 of the brake actuator 300 is typically larger for band brakes. For example, in some embodiments, the angle of entry may be between 40 and 80 degrees. In some embodiments, the angle of entry may be between 50 and 70 degrees. In some embodiments, the angle of entry may be between 55 and 65 degrees. In some embodiments, the angle of entry may be about 60 degrees. Other ranges within those disclosed are also contemplated and the endpoints are not meant to be limiting.

Because disc brakes typically require less force to operate, in some embodiments, where disc brakes are used in braking system 105, the angle of entry $\theta_3$ can be shallower in comparison to band brakes. This can reduce friction applied onto the cable(s), for example, from an interior surface of the nipples of the brake actuator. For example, in some embodiments, the angle of entry may be between 5 and 30 degrees. In some embodiments, the angle of entry may be between 10 and 25 degrees. In some embodiments, the angle of entry may be between 12 and 20 degrees. In some embodiments, the angle of entry may be about 15 degrees. Other ranges within those disclosed are also contemplated and the endpoints are not meant to be limiting.

Brake actuator rotation and cable travel can also be adjusted according to brake type and force requirements. These are related in that increasing the rotation of the brake actuator also increases the cable travel because the cable(s) wrap farther around the handle bar. Also, if the inner diameter of the handle bar is increased, generally the cable travel distance should be increased to apply the required amount of force to operate the brakes. Further, the cable travel can be increased by moving the cable termination ends outward axially from the center of the handle. That is, the closer the termination point is to the end of the housing, the more the cable can wrap around the handle bar, thereby increasing the cable travel.

In either band brake or disc brake systems, in some embodiments, the brake actuator rotation may be between 30 and 115 degrees around the handle bar. In some embodiments, the brake actuator rotation may be between 60 and 85 degrees. In some embodiments, the brake actuator rotation may be between 65 and 80 degrees. In some embodiments, the brake actuator rotation may be between 70 and 75 degrees. In some embodiments, the brake actuator rotation for band brake systems may be about 70 degrees. In some embodiments, the brake actuator rotation for disc brake systems may be about 75 degrees.

Likewise, in either band brake or disc brake systems, in some embodiments, the cable travel may be between 5 and 50 mm. In some embodiments, the cable travel may be between 15 and 30 mm. In some embodiments, the cable travel for band brake systems may be between 17 and 21 mm. In some embodiments, the cable travel for band brake systems may be about 19 mm. In some embodiments, the cable travel for disc brake systems may be between 23 and 27 mm. In some embodiments, the cable travel for disc brake systems may be about 25 mm. Other ranges for brake actuator rotation and cable travel within those disclosed are also contemplated and the endpoints are not meant to be limiting.

Figure 2:
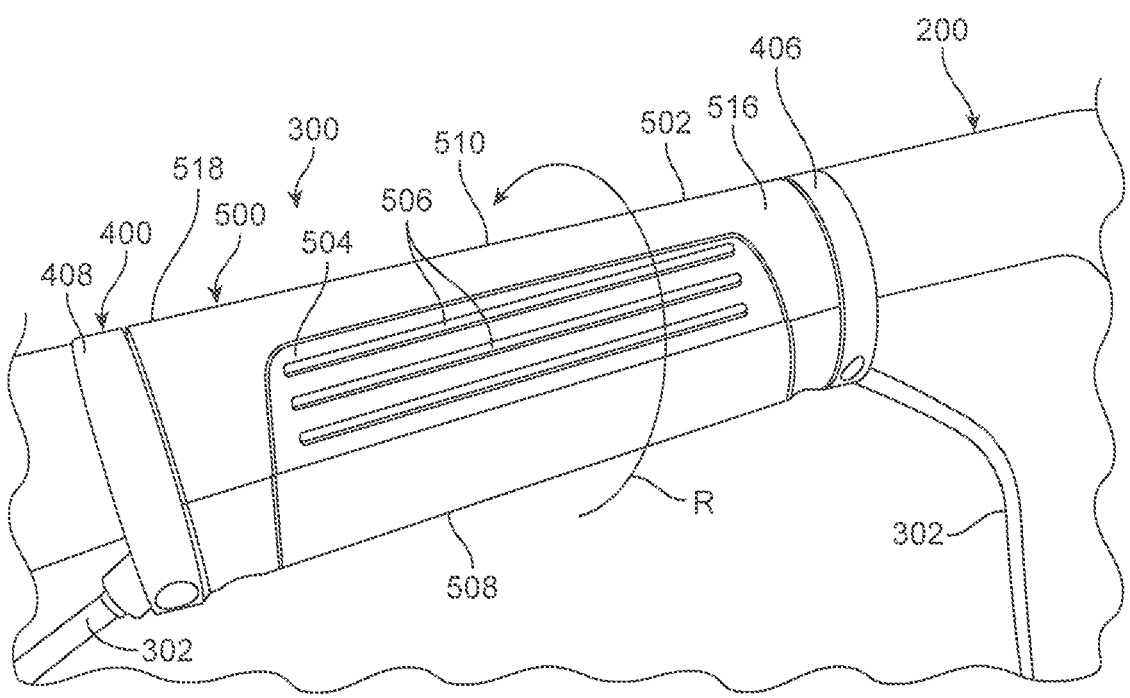
FIG. 2 illustrates a brake actuator, according to an embodiment.

FIG. 2 illustrates brake actuator 300 and handle bar 200, according to an embodiment. As shown in FIG. 2, in some embodiments, brake actuator 300 can be disposed about handle bar 200. In some embodiments, rotating brake actuator 300 about handle bar 200 can activate the braking systems 105 at wheels 104. In some embodiments, rotating brake actuator 300 in the direction shown by the arrow R in FIG. 2 can activate the braking systems 105. As referred to herein, the direction of the arrow R in FIG. 2 represents rotating brake actuator 300 toward the user of carrier 100 (i.e., rearward) where the user is pushing carrier 100, for example, when being used as a stroller. As referred to herein, the view shown in FIG. 2 represents a front perspective view of brake actuator 300. Views from the direction that the user faces while pushing carrier 100 are referred to as rear or rear perspective views. Therefore, for example, a rear perspective view is from the perspective of a user while pushing carrier 100 in a conventional forward direction of travel while holding onto handle bar 200.

Referring to FIGS. 2 through 9, embodiments of brake actuator 300 and components thereof are described in detail. In some embodiments, brake actuator 300 can include a base member 400 and housing 500. In some embodiments, cable(s) 302 can be coupled with brake actuator 300. For example, in some embodiments, a single cable 302 can be disposed through housing 500. In this manner, in some embodiments, a first end of cable 302 can be coupled with a first braking system 105 of a wheel 104, for example, a rear wheel on the right side of carrier 100 as viewed from the user's perspective. In some embodiments, cable 302 can run through brake actuator 300, for example, through housing 500, and also connect to a second braking system 105 at a second wheel 104, for example, a rear wheel on the left side of carrier 100 as viewed from the user's perspective. In some embodiments, two cables 302 can be coupled with brake actuator 300, for example, to an interior of housing 500. The first cable 302 can connect to a first braking system 105 and the second cable can connect to a second braking system 105. In some embodiments, in order to activate one or both of the braking systems 105, the user can rotate brake actuator 300 toward the user (i.e., in the rearward direction), as shown for example in FIG. 2. In some embodiments, the user can rotate the brake actuator 300 forward in order to activate the braking system(s) 105.

Figure 3:
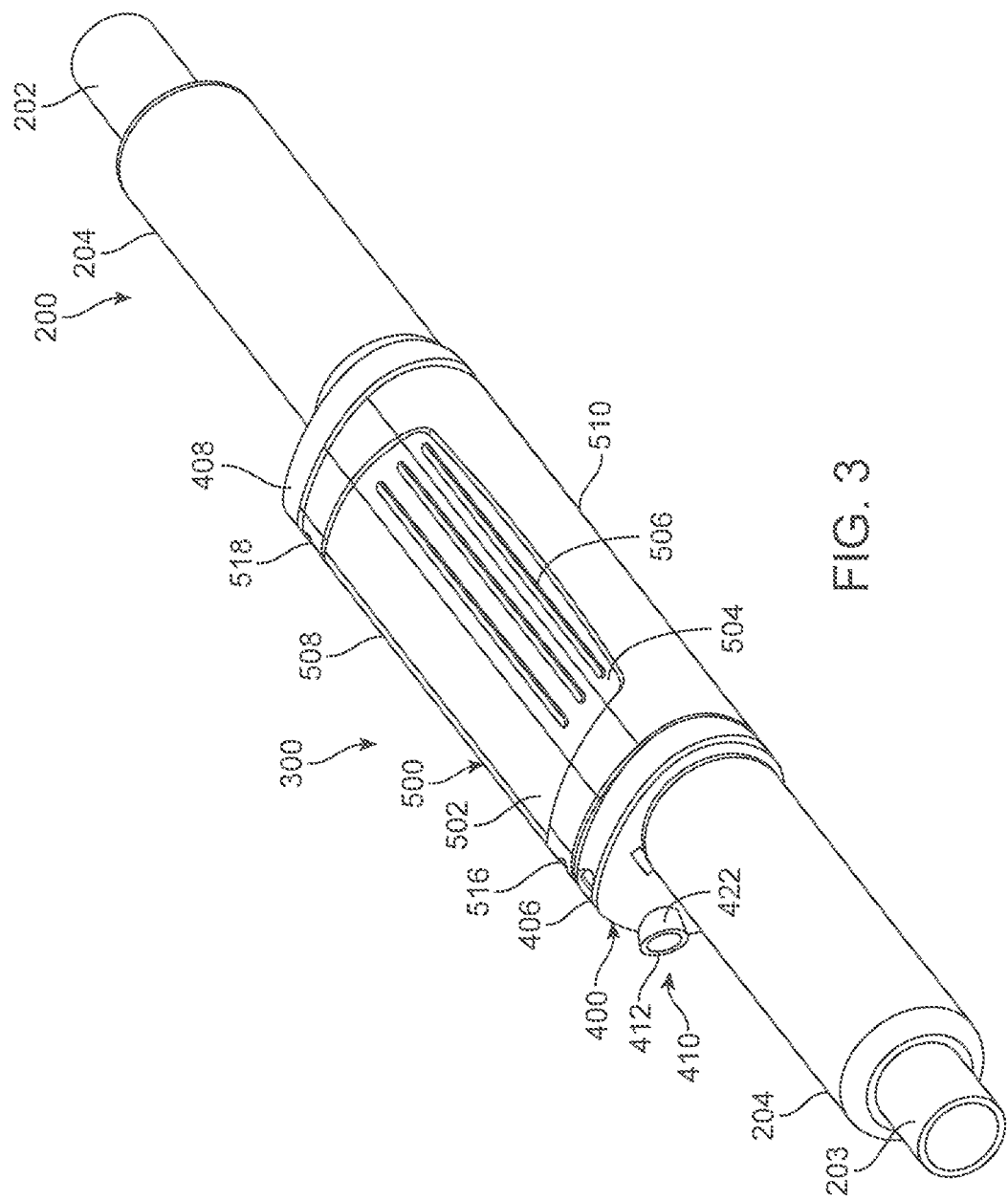
FIG. 3 illustrates a rear perspective view of a brake actuator, according to an embodiment.
Figure 4:
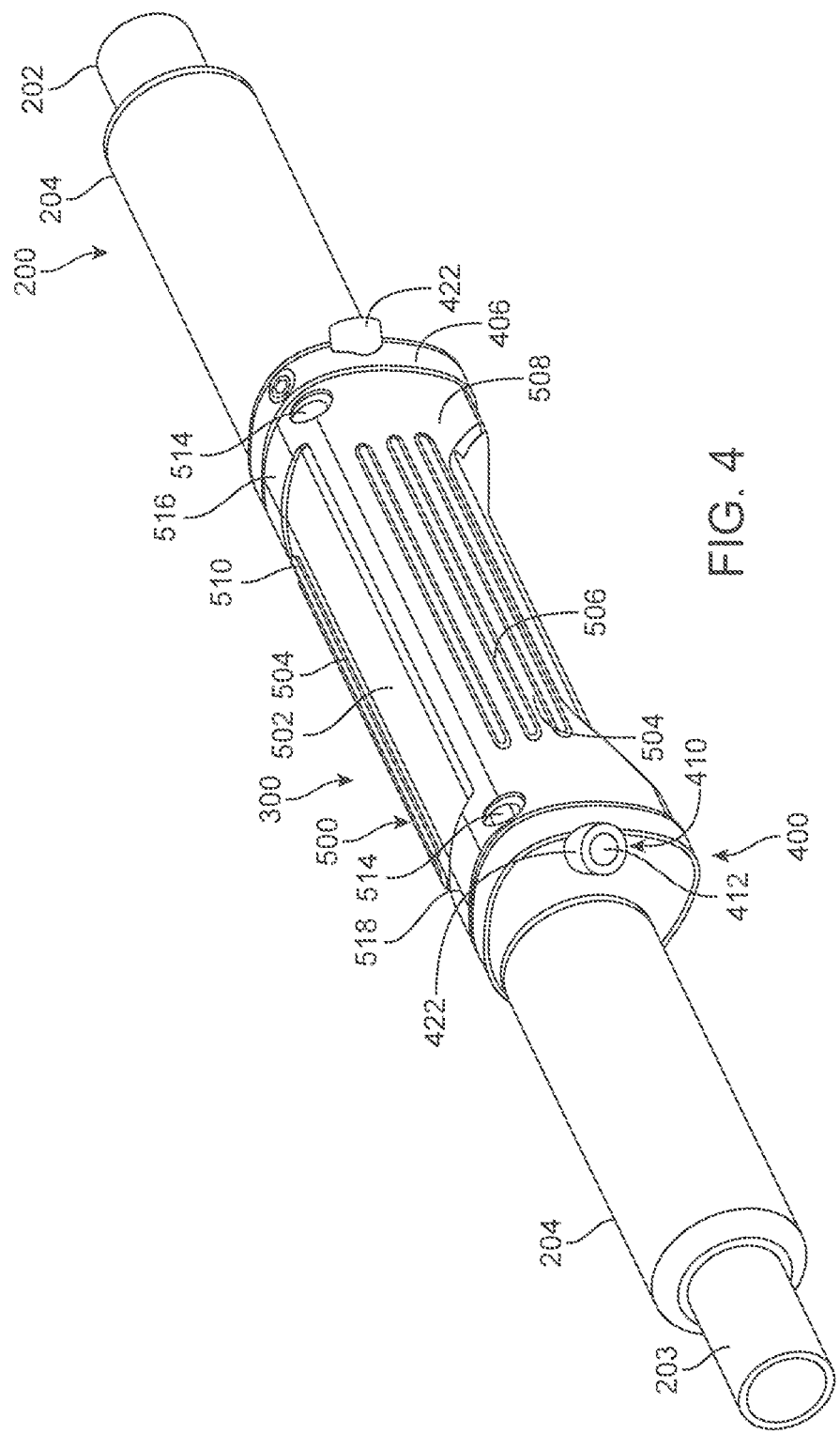
FIG. 4 illustrates a front perspective view of a brake actuator, according to an embodiment.

FIGS. 3 and 4 illustrate a rear perspective view and a front perspective view, respectively, of a brake actuator 300 and handle bar 200, according to an embodiment. In some embodiments, handle bar 200 can include a bar 202 about which brake actuator 300 can be disposed. Bar 202 can be made of any suitable material, for example, metal, plastic, or composite. In some embodiments, bar 202 can be cylindrical. In some embodiments, bar 202 can have a hollow interior. Bar 202 can have a central axis disposed in a lengthwise direction. In some embodiments, the central axis can be an axis of rotation for brake actuator 300.

In some embodiments, one or more pad 204 can be disposed about bar 202. Pads 204 can be disposed about all or a portion of bar 202. In some embodiments, pads 204 can be foam or another material to provide a softer gripping surface for the user to hold while pushing carrier 100.

Figure 5:
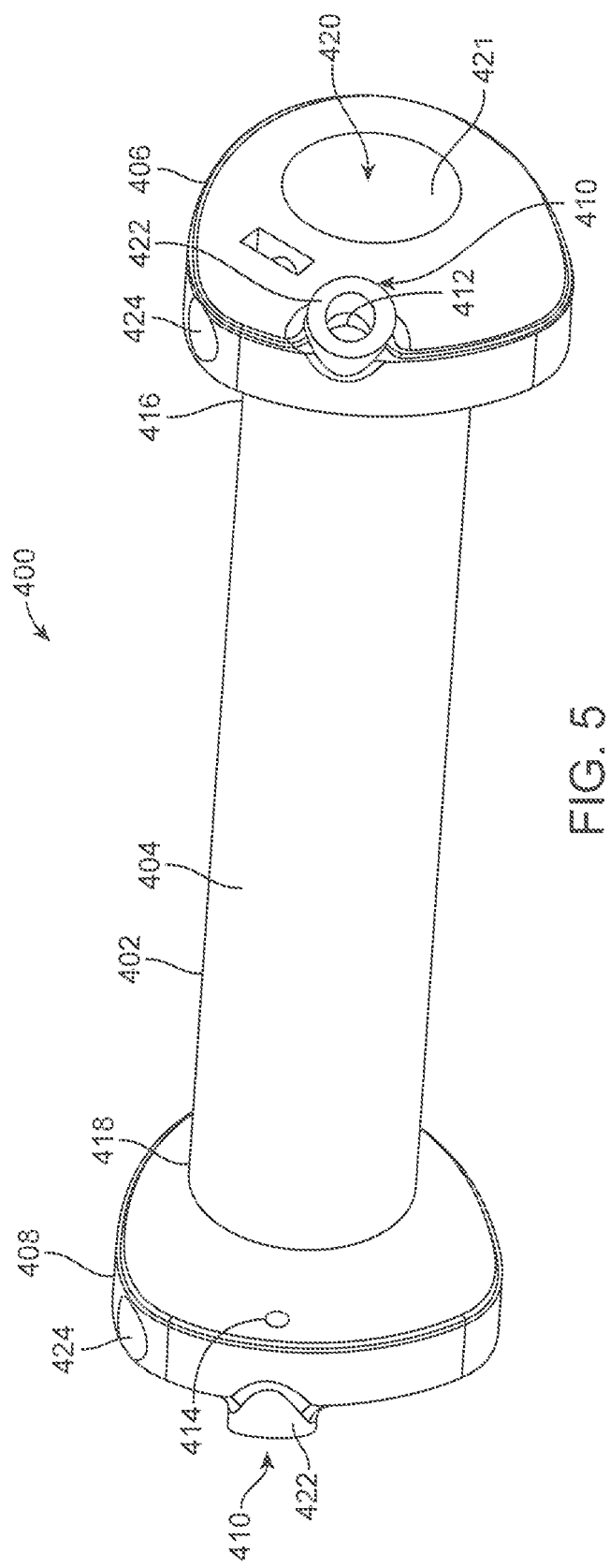
FIG. 5 illustrates a front perspective view of a base member of a brake actuator, according to an embodiment.
Figure 6:
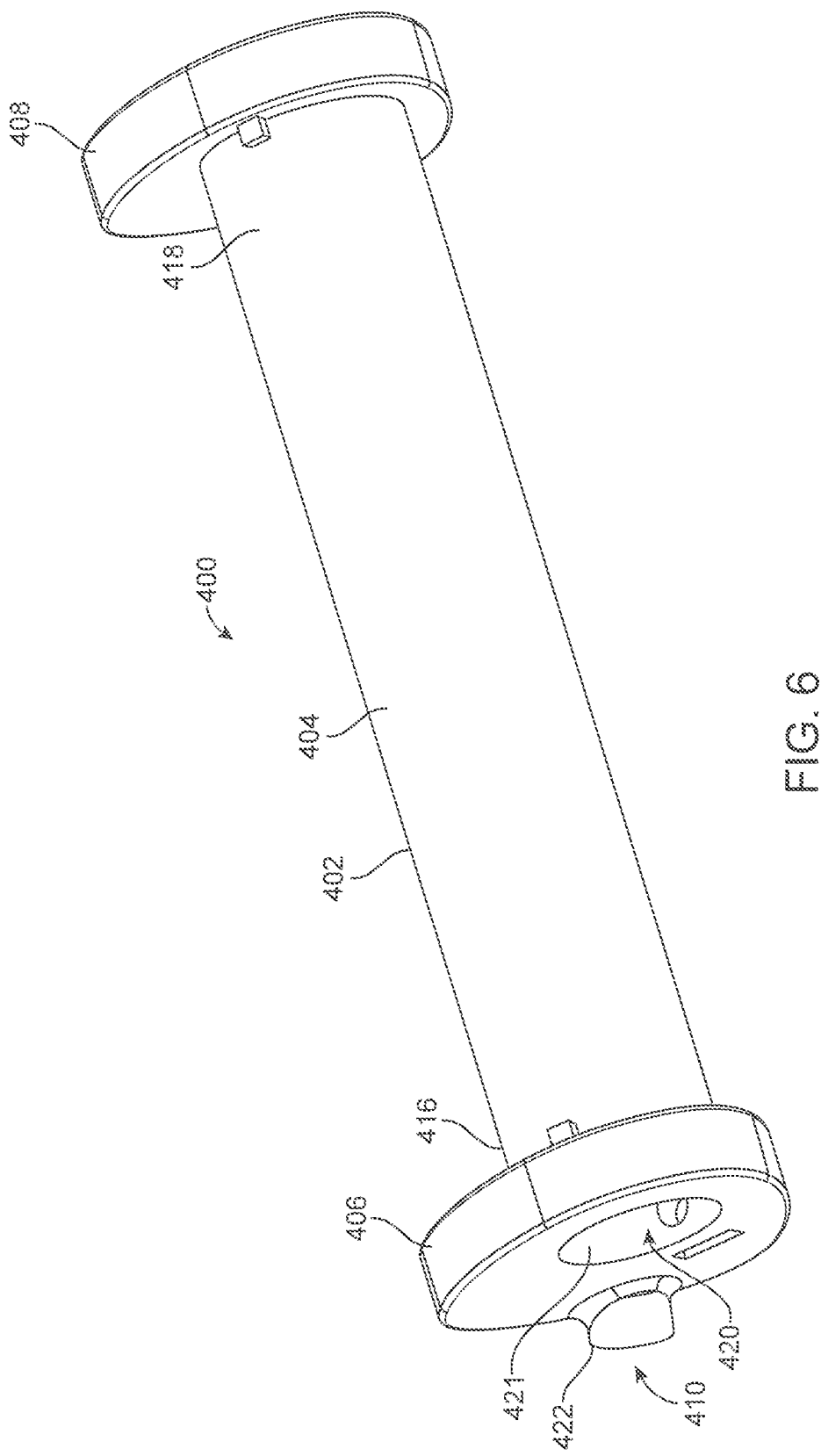
FIG. 6 illustrates a rear perspective view of a base member of a brake actuator, according to an embodiment.

In some embodiments, brake actuator 300 can include base member 400, as shown for example in FIGS. 5 and 6. Base member 400 can be made of any suitable material, for example, metal, plastic, or composite. In some embodiments, base member 400 can be disposed about bar 202. For example, in some embodiments, base member 400 can include a through-hole 420 through which bar 202 can extend. In some embodiments, through-hole 420 can include inner surface 421, which can be disposed against an outer surface 203 of bar 202. In some embodiments, through-hole 420 can have a size and shape that conforms to an outer surface of bar 202 such that through-hole 420 is coaxial with bar 202. As discussed, for example, with respect to FIG. 16, in some embodiments, base member 400 can have a first portion 432 coupled to a second portion 434 around bar 202.

In some embodiments, base member 400 can include main body 404 having an outer surface 402. In some embodiments, main body 404 can be cylindrical and through-hole 420 can extend therethrough, forming a tubular elongate member. In some embodiments, base member 400 can have a first collar 406 disposed at a first end 416 of main body 404. In some embodiments, base member 400 can have a second collar 408 disposed at a second end 418 of main body 404. First collar 406 and second collar 408 can have a shape and size that is larger than through-hole 420 of main body 404. In some embodiments, the collars 406, 408 can be any suitable shape, for example, circular, oval, oblong, elliptical, or any other shape. In some embodiments, first and second collars 406, 408 may not be symmetrically disposed about through-hole 420. For example, in some embodiments, first and second collars 406, 408 may extend further in the forward direction away from the central axis of bar 202.

In some embodiments, first collar 406 and second collar 408 can have a passage 410 extending therethrough. In some embodiments, passage 410 can have an outer opening 412 disposed on an exterior side of the collar and an inner opening 414 on an interior side of the collar. In some embodiments, outer opening 412 can be larger than inner opening 414. In some embodiments, outer opening 412 and/or inner opening 414 can be circular. In some embodiments, passage 410 can include a protrusion (e.g., a nipple) 422 extending from the surface of collars 406, 408. For example, protrusion 422 can extend from an exterior surface of collars 406, 408 and define outer opening 412 of passage 410.

In some embodiments, cable 302 can extend through passage 410 of both first collar 406 and second collar 408. For example, in some embodiments, cable 302 can extend through outer opening 412 of passage 410 on first collar 406, through first collar 406, and out of inner opening 414 of first collar 406. In some embodiments, cable 302 can extend across a length of the main body 404 of base member 400, with or without contacting main body 404, into the inner opening 414 of second collar 408, and exit the outer opening 412 of passage 410 of second collar 408.

In some embodiments, base member 400 can include one or more screw holes 424 located in the surface of base member 400, for example, in first collar 406, second collar 408, and/or main body 404. Screw holes 424 can be configured to receive a screw or another fastener so that base member 400 can be coupled with housing 500.

Figure 7:
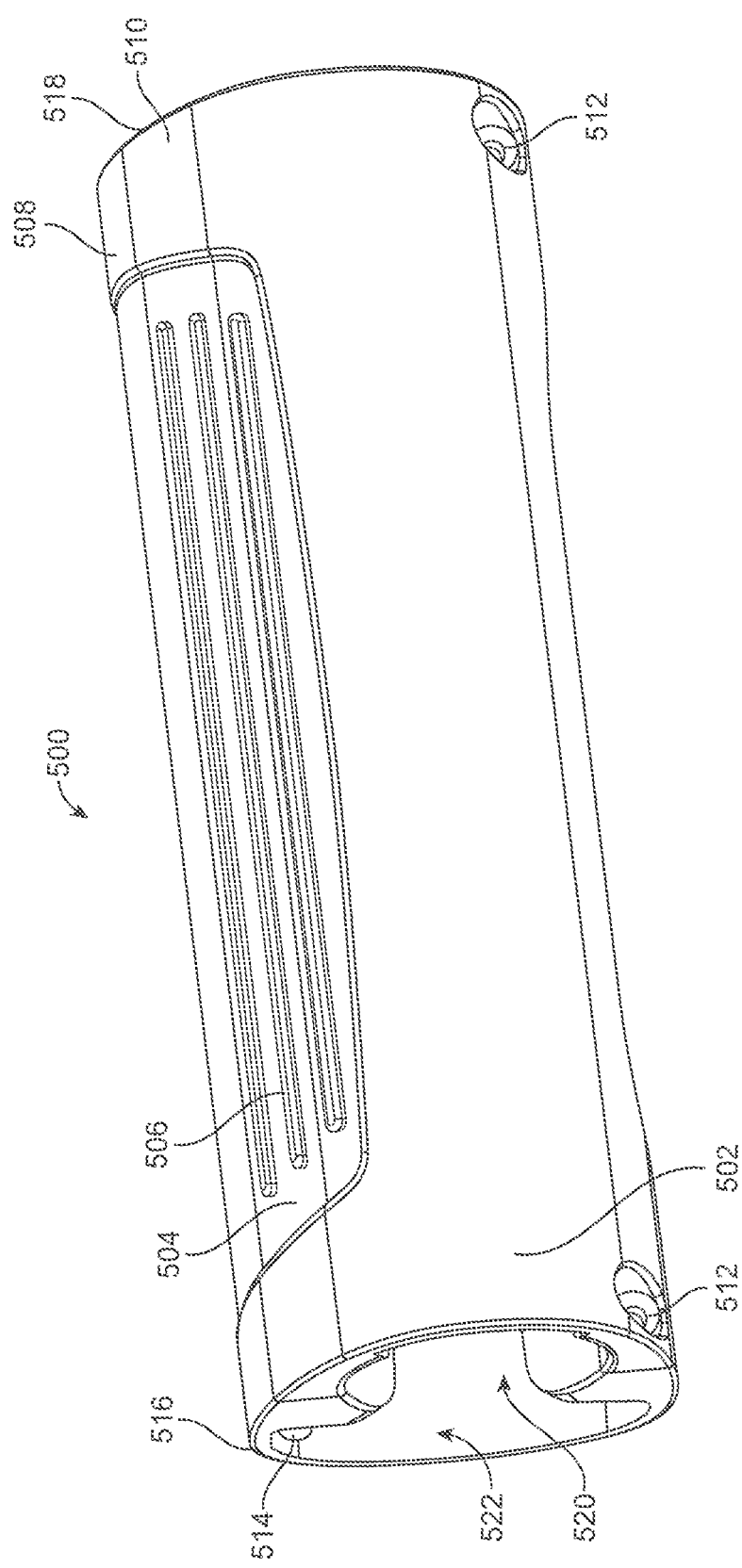
FIG. 7 illustrates a rear perspective view of a housing of a brake actuator, according to an embodiment.
Figure 8:
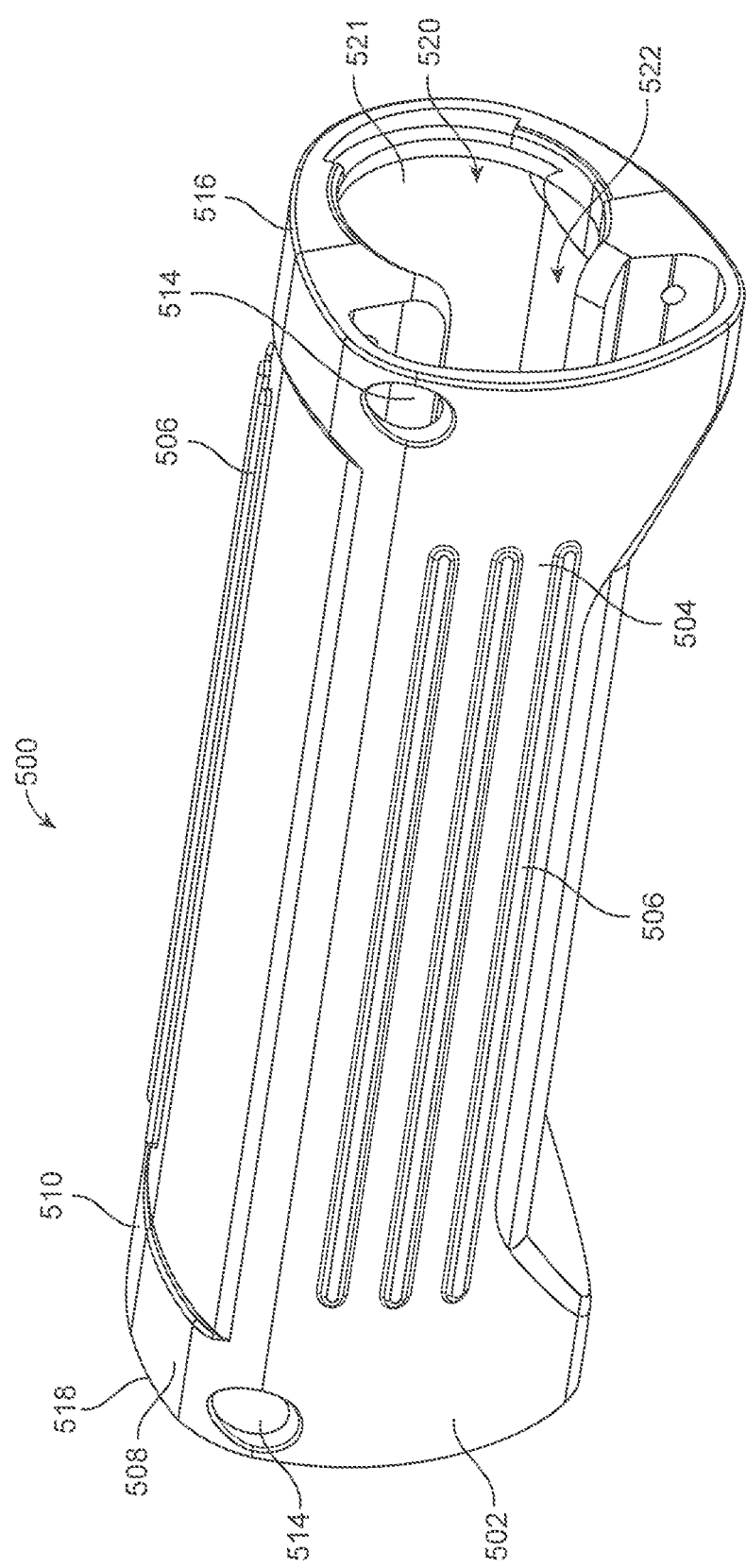
FIG. 8 illustrates a front perspective view of a housing of a brake actuator, according to an embodiment.
Figure 9:
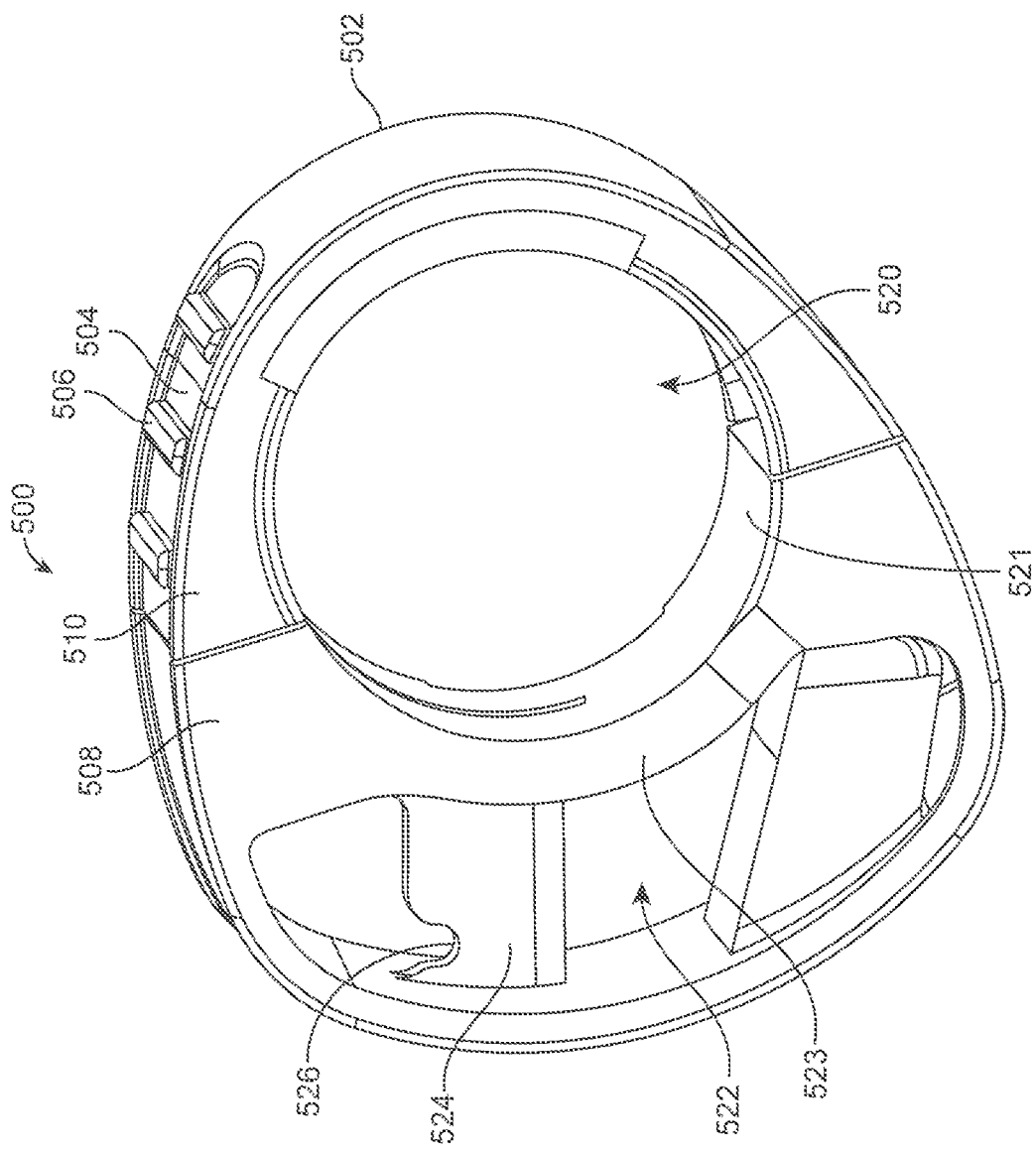
FIG. 9 illustrates a side perspective view of a housing of a brake actuator, according to an embodiment.

Referring to FIGS. 7 through 9, in some embodiments, brake actuator 300 can include housing 500. Housing 500 can be made from any suitable material, for example, plastic, metal, or composite. In some embodiments, housing 500 can be disposed about base member 400. In some embodiments, housing 500 can be coupled with base member 400, for example, by screws or other fasteners which can extend through screw holes 514, for example, as shown in FIG. 8. Base member 400 and housing 500 can be coupled by other mechanisms, for example, friction fit, snap fit, etc. In some embodiments, housing 500 can rotate around base member 400.

Housing 500 can include outer surface 502. In some embodiments, outer surface 502 can include one or more gripping portions 504. In some embodiments, outer surface 502 can include two gripping portions 504. In some embodiments, gripping portion 504 can include one or more ridge 506 protruding from outer surface 502 of housing 500. In some embodiments, gripping portion 504 can include two, three, four or more ridges 506. The gripping portion 504 can facilitate gripping of housing 500 by the user, for example, in order to rotate brake actuator 300. In some embodiments, housing 500 can include a first portion 508 and a second portion 510. In some embodiments, each of first portion 508 and second portion 510 of housing 500 can include a gripping portion 504. In some embodiments, first portion 508 can face away from the user (i.e., the front portion), as shown in FIG. 8. In some embodiments, second portion 510 can face the user (i.e., the rear portion), as shown in FIG. 7. In some embodiments, housing 500 can include one or more screw hole 512 through which a screw or other fastener can couple first portion 508 and second portion 510. First portion 508 and second portion 510 of housing 500 can be coupled by other mechanisms, for example, friction fit, snap fit, etc. In some embodiments, housing 500 can be a single integral member.

Housing 500 can include a through-hole 520, which can have an inner surface 521. In some embodiments, inner surface 521 of through hole 520 can be formed from both the first portion 508 and the second portion 510 of housing 500, as shown for example in FIG. 9. In some embodiments, inner surface 521 of through-hole 520 can have a size and shape configured to be disposed about outer surface 402 of the main body 404 of base member 400. In some embodiments, through-hole 520 can be coaxial with through-hole 420 of base member 400 and/or bar 202 of handle bar 200. In some embodiments, through-hole 520 can be cylindrical.

Figure 10:
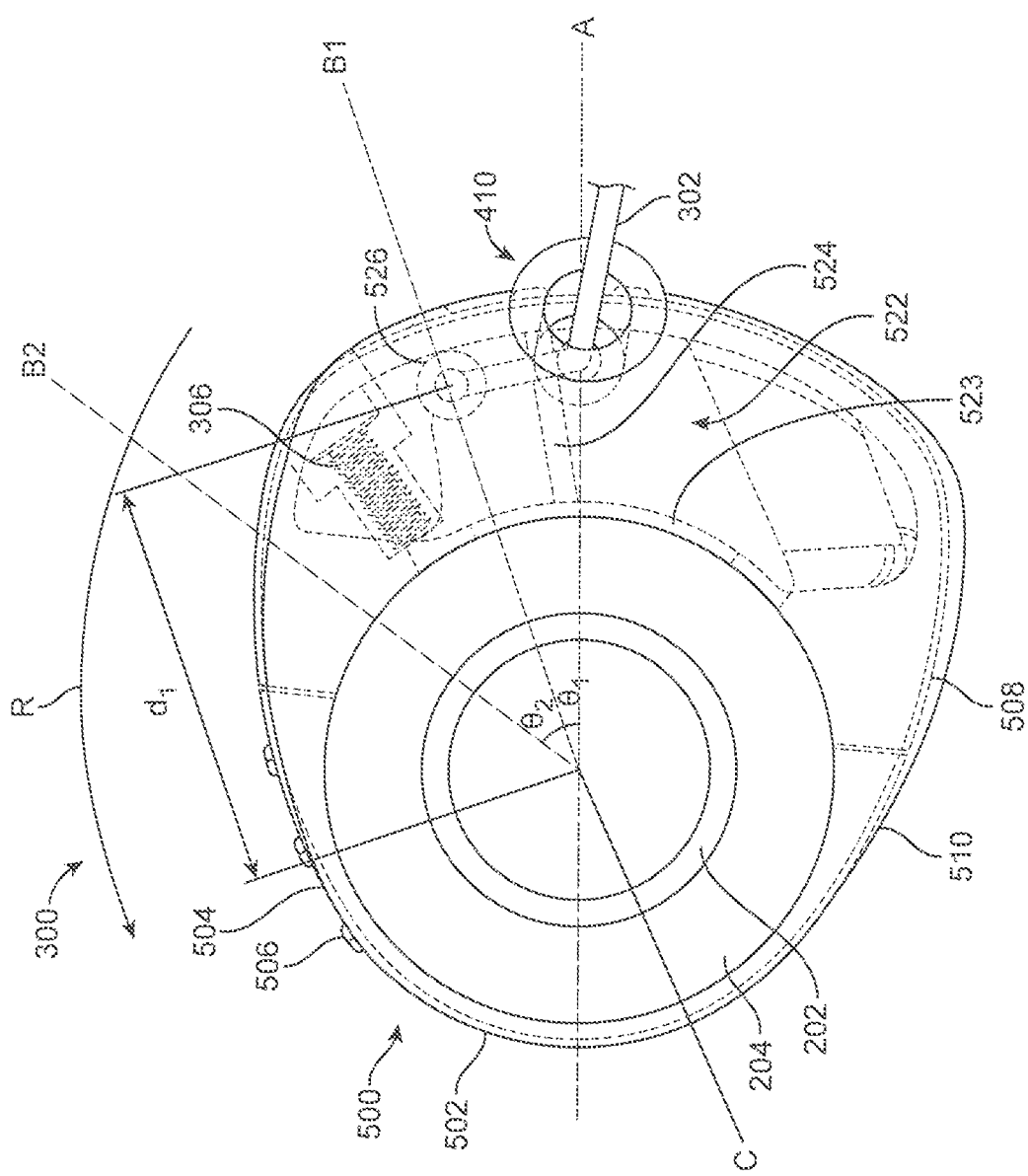
FIG. 10 illustrates a partial cut-away side view of a brake actuator, according to an embodiment.

In some embodiments, as shown for example in FIGS. 9 and 10, housing 500 can include one or more cavity 522 extending through housing 500. In some embodiments, cavity 522 can extend entirely through housing 500 from a first end 516 to a second end 518. In some embodiments, a wall 523 can at least partially separate cavity 522 and through-hole 520 within housing 500. This can separate cavity 522 from the main body 404 of base member 400 extending through the through-hole 520 of housing 500. In some embodiments, a ledge 524 can be disposed within cavity 522. In some embodiments, ledge 524 can be a piece of material extending from wall 523 to first portion 508 of housing 500. In some embodiments, cable 302 can extend through cavity 522 and across ledge 524, for example, across an upper surface of ledge 524. Thus, when brake actuator 300 is rotated, for example toward the user, the ledge 524 can help displace the cable 302 to activate the braking system 105 at wheels 104. In some embodiments, ledge 524 can include one or more notch 526. In some embodiments, cable 302 can be disposed within notch 526, for example, as shown in FIG. 10. This can facilitate retention of cable 302 across or within ledge 524. In some embodiments, ledge 524 can have a hole (not shown) therethrough, through which the cable 302 can extend.

FIG. 10 illustrates a partial interior view of brake actuator 300 as viewed from second end 418 of base member 400 and second end 518 of housing 500 (i.e., the right side of carrier 100 as viewed from the user's perspective while pushing carrier 100). Center point C can be the lengthwise center axis of bar 202, which can also be the axis of rotation for brake actuator 300. As shown in the embodiment of FIG. 10, in some embodiments, cable 302 can enter passage 410 of base member 400, extend into cavity 522 of housing 500, and across ledge 524 of housing 500, for example within notch 526. As shown, for example, in FIG. 10, in some embodiments, an upper surface of ledge 524 can be disposed above passage 410 thereby creating a "pre-load" angle $\theta_1$ for cable 302 when it is disposed through housing 500 in a starting or "at rest" position for brake actuator 300, where brake actuator 300 is not rotated.

The pre-load angle $\theta_1$ can be defined as an angle between an axis A through a center of passage 410 and axis B1 through a center of cable 302 where it passes across ledge 524, as shown for example in FIG. 10. In some embodiments, $\theta_1$ can be greater than 10 degrees. In some embodiments, $\theta_1$ can be between 5 and 30 degrees. In some embodiments, $\theta_1$ can be between 10 and 25 degrees. In some embodiments, $\theta_1$ can be between 15 and 20 degrees. In some embodiments, $\theta_1$ can be between 17 and 19 degrees. In some embodiments, $\theta_1$ can be about 18 degrees. This can provide brake actuator 300 with some pre-loaded force to facilitate activation of the brakes 105.

When brake actuator 300 is rotated, for example in the direction of the arrow R in FIG. 10 (i.e., toward the user), cable 302 disposed across ledge 524 can be displaced and angle $\theta_2$ in the direction of the arrow R shown in FIG. 10. For example, cable 302 can end up being disposed with axis B2 extending through the center of cable 302 along ledge 524. In some embodiments, the displacement from axis B1 to axis B2 (i.e., $\theta_2$) can be between 30 and 60 degrees. In some embodiments, $\theta_2$ can be between 35 and 55 degrees. In some embodiments, $\theta_2$ can be between 40 and 50 degrees. In some embodiments, $\theta_2$ can be between 44 and 46 degrees. In some embodiments, $\theta_2$ can be about 45 degrees. When brake actuator 300 is rotated fully to B2, braking systems 105 at wheels 104 can achieve full lock out such that motion of carrier 100 in the forward and rearward directions of travel is prevented.

As also shown in FIG. 10, cable 302 can be located a distance $d_1$ from a center point C of a central axis of bar 202. In some embodiments, $d_1$ can be between 20 mm and 30 mm. In some embodiments, $d_1$ can be between 22 mm and 28 mm. In some embodiments, $d_1$ can be between 24 mm and 26 mm. In some embodiments, $d_1$ can be about 25 mm. This can provide the proper angle to apply force along cable 302 to the brakes 105.

Figure 11:
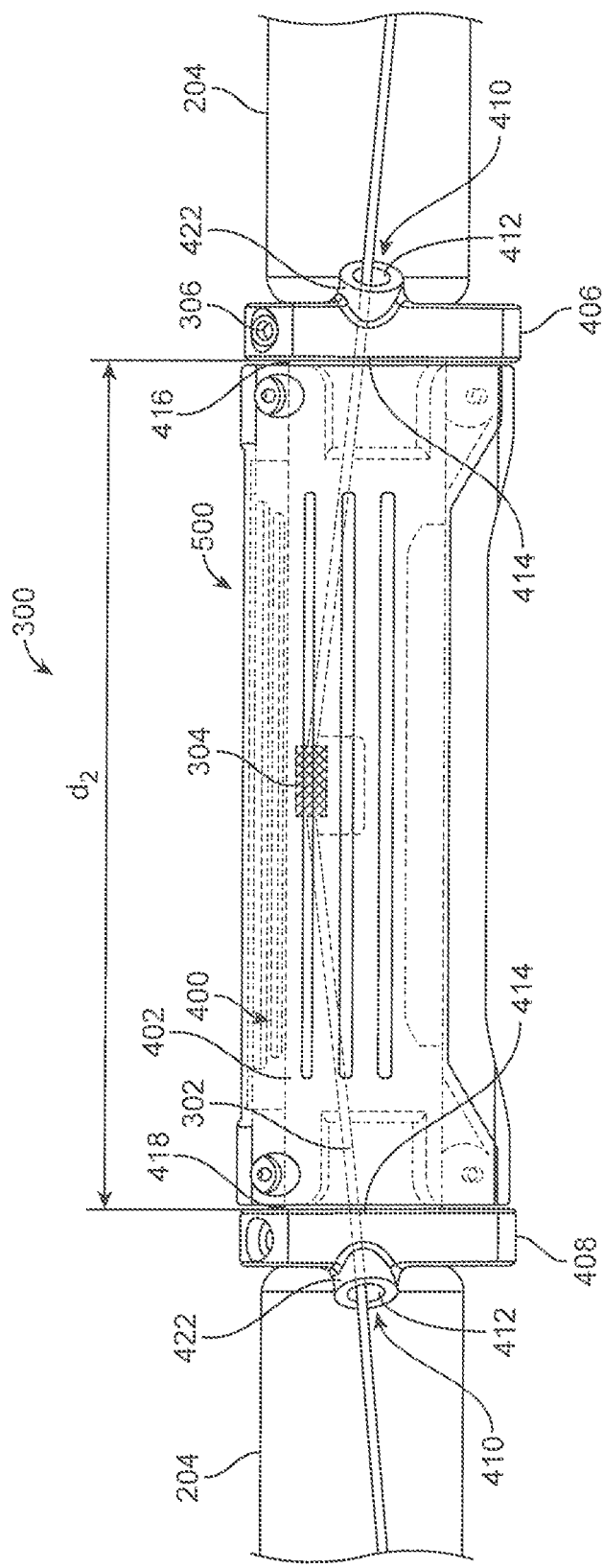
FIG. 11 illustrates a partial cut-away front view of a brake according brake actuator, according to an embodiment.

FIG. 11 illustrates a partial front view of brake actuator 300, according to an embodiment. FIG. 11 shows a pathway of cable 302 through brake actuator 300, according to an embodiment. Cable 302 can enter outer opening 412 of passage 410, for example, via protrusion 422, pass through second collar 408, and exit inner opening 414. Cable 302 can then enter cavity 522 of housing 500 and pass across ledge 524. Cable 302 can then enter inner opening 414 of passage 410 in first collar 406 and exit outer opening 412 via protrusion 422 of first collar 406.

In some embodiments, cable 302 can include a crimped portion 304. In some embodiments, crimped portion 304 can be a piece of material crimped onto cable 302 to provide a larger area. In some embodiments, crimped portion 304 can be disposed in notch 526 of ledge 524 to help stabilize cable 302 within housing 500. As shown for example in FIG. 12, in some embodiments, crimped portion 304 can be disposed within a hole or window 525 of housing 500 to reduce lateral movement of cable 302 within housing 500. As shown in FIG. 11, in some embodiments, screw 306 or other fastening device can be used to couple first portion 508 of housing 500 with second portion 510 of housing 500.

Figure 12:
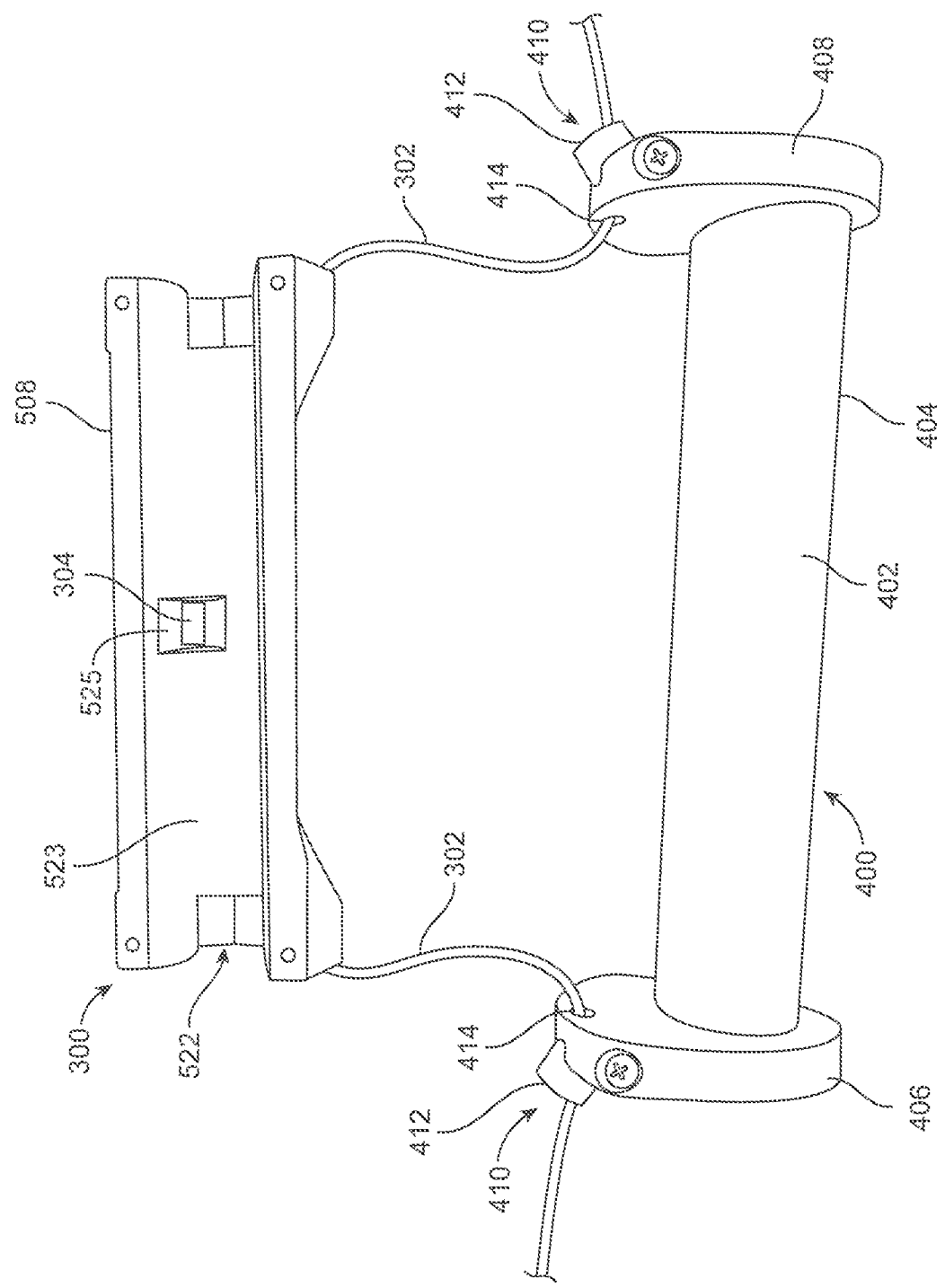
FIG. 12 illustrates a partial exploded view of a brake actuator, according to an embodiment.

FIG. 12 illustrates a partial exploded view of brake actuator 300, according to an embodiment. As shown in FIG. 12, in some embodiments, cable 302 can extend through passage 410 of first collar 406 into cavity 522 of housing 500 and then through passage 410 of second collar 408. In some embodiments, first portion 508 of housing 500 can have a wall 523 configured with a contour to fit about main body 404 of base member 400. In some embodiments, first portion 508 can have cavity 522 through which cable 302 extends. In some embodiments, a crimped portion 304 can be added to cable 302 through a window 525 of cavity 522 so that lateral movement of cable 302 is reduced within housing 500. In some embodiments, crimped portion 304 can be used instead of, or in addition to, ledge 524 of housing 500.

Figure 13:
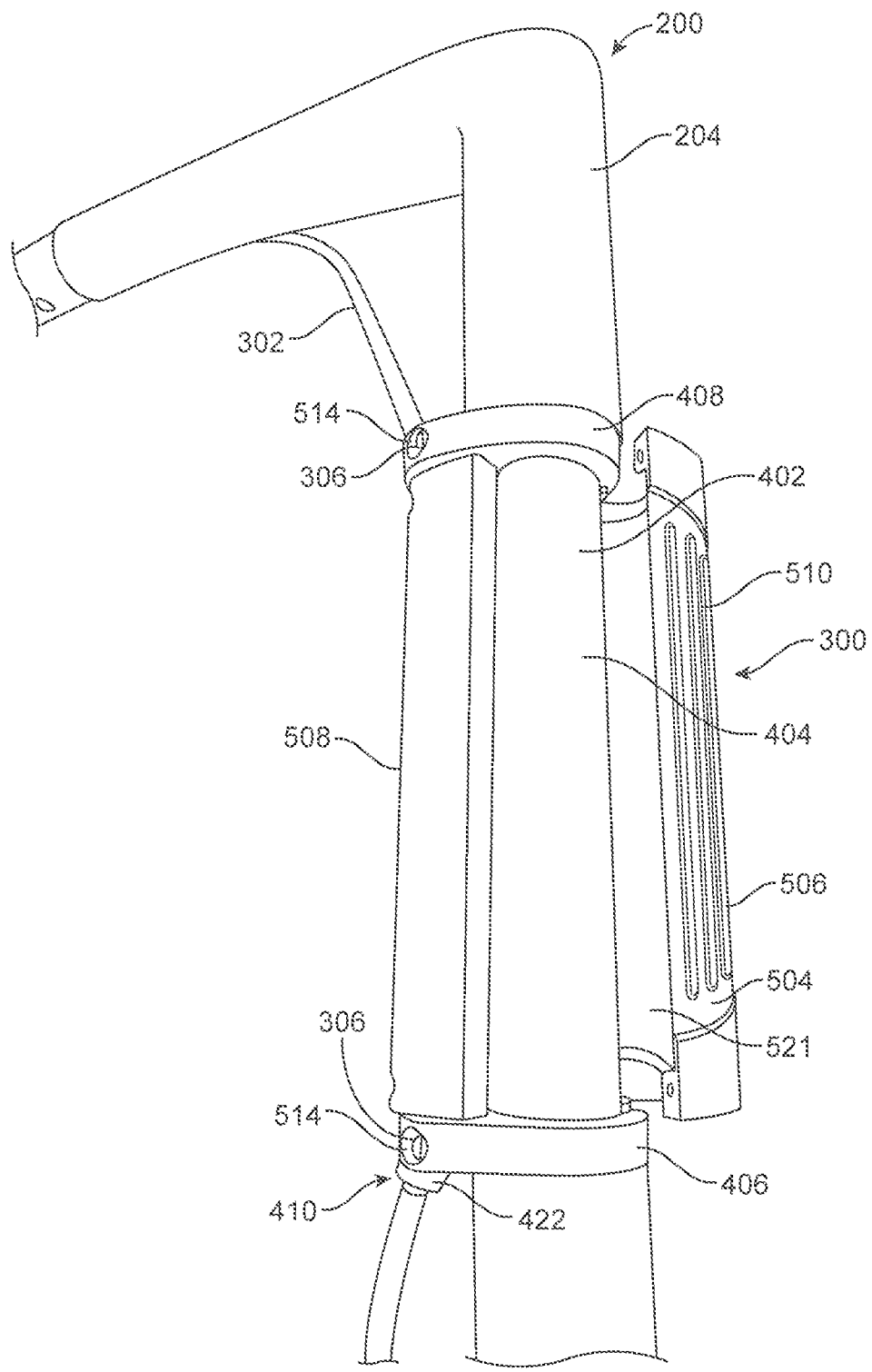
FIG. 13 illustrates a perspective view of a brake actuator, according to an embodiment.

FIG. 13 illustrates brake actuator 300 being assembled to handle bar 200, according to an embodiment. In some embodiments, first portion 508 of housing 500 can be coupled with base member 400 and second portion 510 of housing 500 can be coupled with first portion 508 of housing 500 and base member 400. Inner surface 521 of first portion 508 and second portion 510 of housing 500 can be configured to fit tightly about outer surface 402 of main body 404 of base member 400. In some embodiments, housing 500 can have a friction fit about base member 400. In some embodiments, brake actuator 300 can be disposed in the center of handle bar 200. In some embodiments, brake actuator 300 can be disposed closer to one end or another of handle bar 200.

Figure 14:
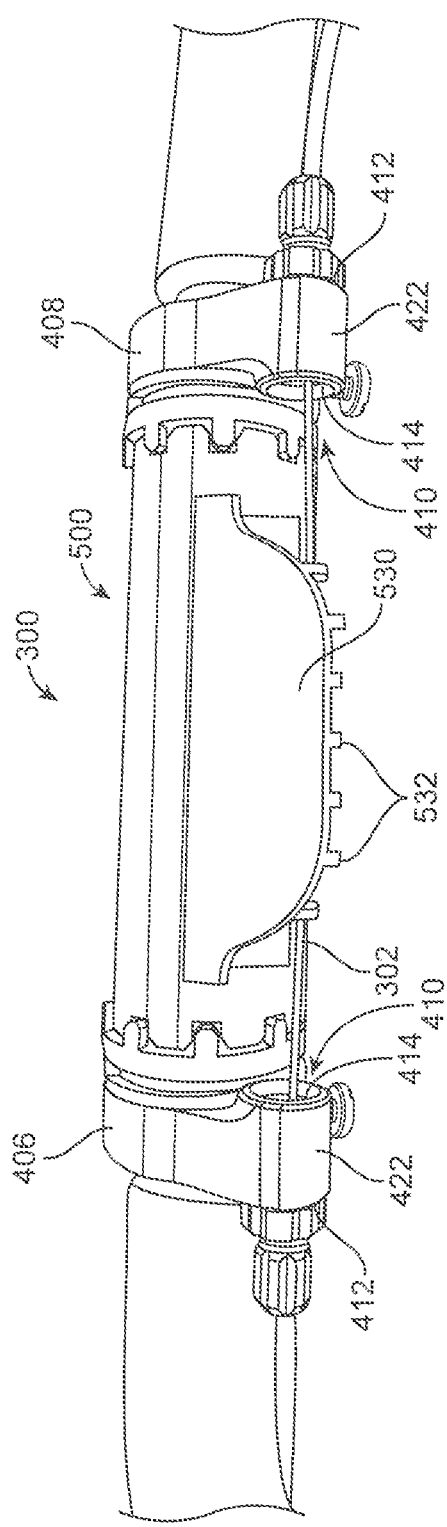
FIG. 14 illustrates a rear perspective view of a brake actuator, according to an embodiment.
Figure 15:
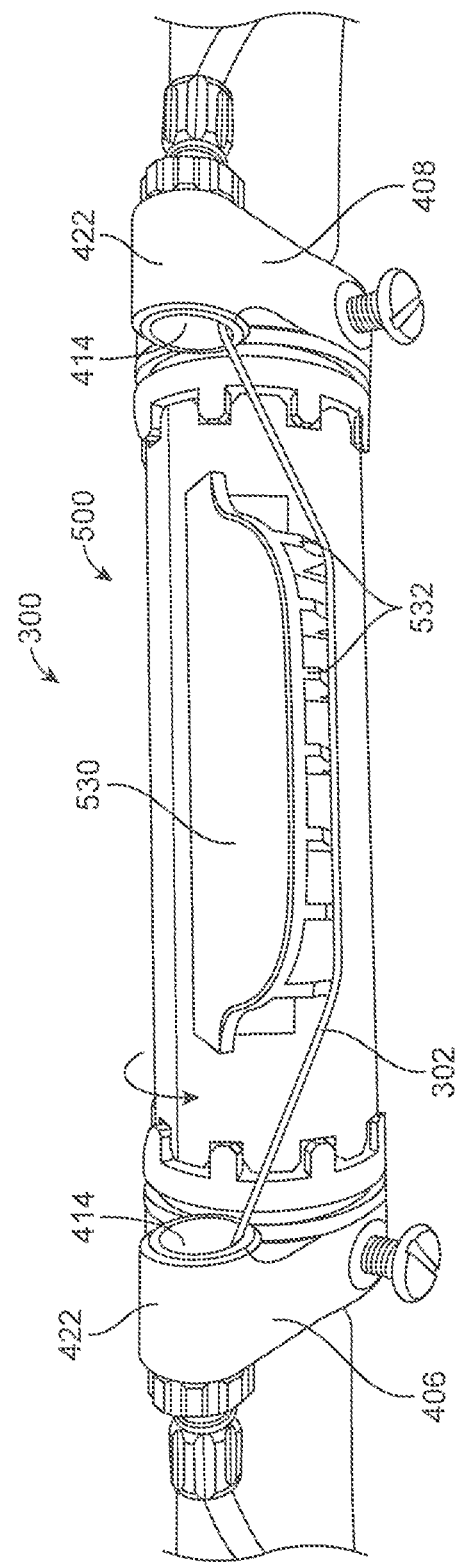
FIG. 15 illustrates a rear perspective view of a brake actuator, according to an embodiment.

FIGS. 14 and 15 illustrate brake actuator 300, according to an embodiment. In some embodiments, cable 302 can be disposed exterior to housing 500. For example, as shown in FIGS. 14 and 15, in some embodiments, cable 302 can extend through passage 410 of first collar 406 of base member 400, for example through an outer opening 412 and an inner opening 414 of protrusion 422. In some embodiments, cable 302 can extend under a paddle 530 of housing 500 and then through passage 410 of second collar 408, for example, through an inner opening 414 and then through an outer opening 412 of protrusion 422. In some embodiments, cable 302 can engage one or more flange 532 extending from paddle 530. As shown, for example in FIG. 15, when brake actuator 300 is rotated by the user, for example, toward the user, cable 302 can be displaced by paddle 530, thereby activating the braking systems 105 at wheels 104.

Figure 16:
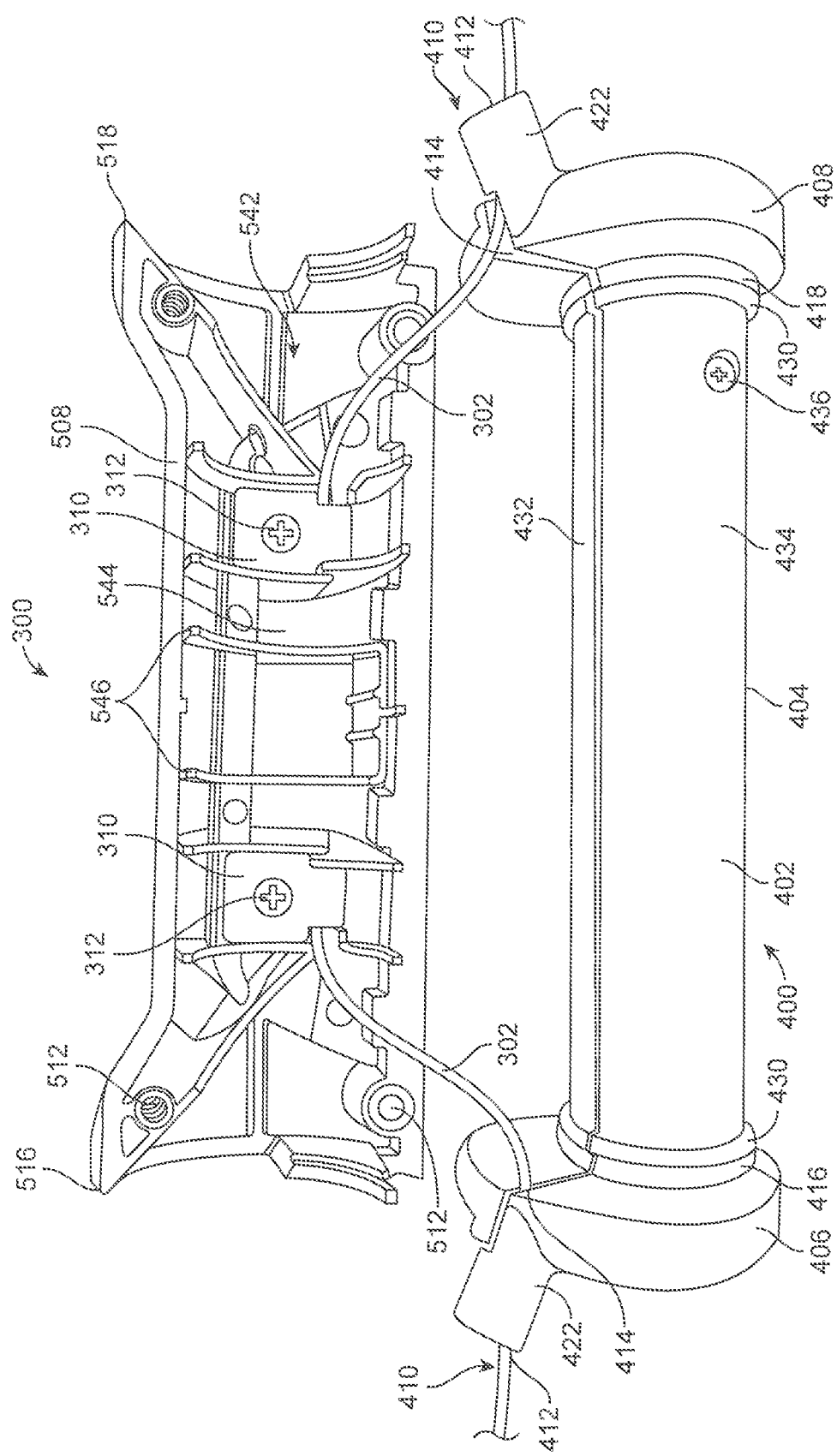
FIG. 16 illustrates a partial exploded view of a brake actuator, according to an embodiment.
Figure 18:
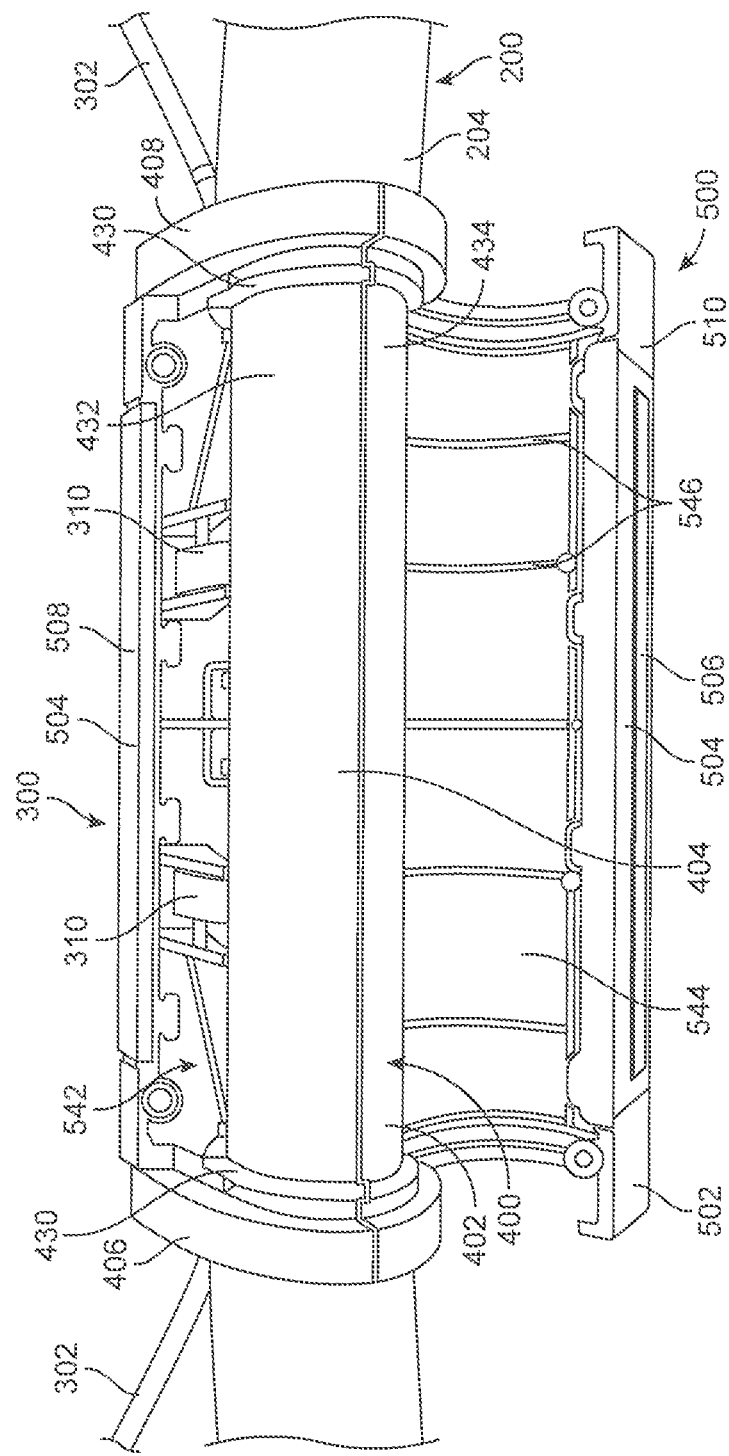
FIG. 18 illustrates a rear perspective view of a brake actuator, according to an embodiment.

FIG. 16 illustrates a partial exploded view of brake actuator 300, according to an embodiment. FIG. 18 illustrates the embodiment of FIG. 16 attached to handle bar 200. Many of the components are similar to those shown and described in the embodiments of FIGS. 4-8 and 12, for example, and are indicated by like reference numbers. For example, brake actuator 300 can include base member 400 having a main body 404 and first and second collars 406, 408 with passages 410 for cables 302. Likewise, housing 500 can have a first portion 508, a second portion 510, and an outer surface 502 with one or more gripping portions 504 with ridges 506.

As shown in FIG. 16, in some embodiments, first and second cables 302 can be coupled to brake actuator 300. In some embodiments, first ends of the cables 302 can be connected to respective braking systems 105, as shown for example in FIG. 1. As shown in FIG. 16, in some embodiments, second ends of the cables 302 can be coupled to housing 500, for example, first portion 508 of housing 500 or second portion 510 of housing 500. In some embodiments, the second ends of the cables 302 can be coupled to housing 500 by cable couplings 310. In some embodiments, cable couplings 310 can be plastic or metal components used to fixedly couple the second ends of the cables 302 to housing 500, for example, with a screw 312. Other mechanisms for coupling the ends of cables 302 to housing 500 can be used, for example, adhesives, friction-fit, etc. As shown, for example, in FIG. 17, in some embodiments, cables 302 can have a bearing 301 disposed at or near the end of the cable 302, which can be retained by cable coupling 310 to couple the cable 302 with housing 500. Bearing 301 can be, for example, a spherical or cylindrical component at the end of cable 302.

In some embodiments, a first cable 302 can extend through passage 410 of first collar 406, for example through nipple 422, and into an interior cavity 542 defined by housing 500. Likewise, a second cable 302 can extend through passage 410 of second collar 408 and into interior cavity 542 of housing 500. In some embodiments, first portion 508 of housing 500 can have an interior surface with one or more ribs 546 extending therefrom. In some embodiments, ribs 546 can be curved to contact and correspond with the outer surface 402 of main body 404 of base member 400.

As shown in FIG. 16, in some embodiments, base member 400 can have a first portion 432 and a second portion 434, which can be coupled together, for example, by screws 436, snap-fit, friction fit, adhesive, or other attachment means. In some embodiments, base member 400 can include one or more bearing surface 430 to facilitate rotation of housing 500 around base member 400. Bearing surface 430 can be, for example, a raised ring around main body 404 of base member 400. In some embodiments, main body 404 can include a bearing surface 430 at first end 416 and/or at second end 418.

Figure 17:
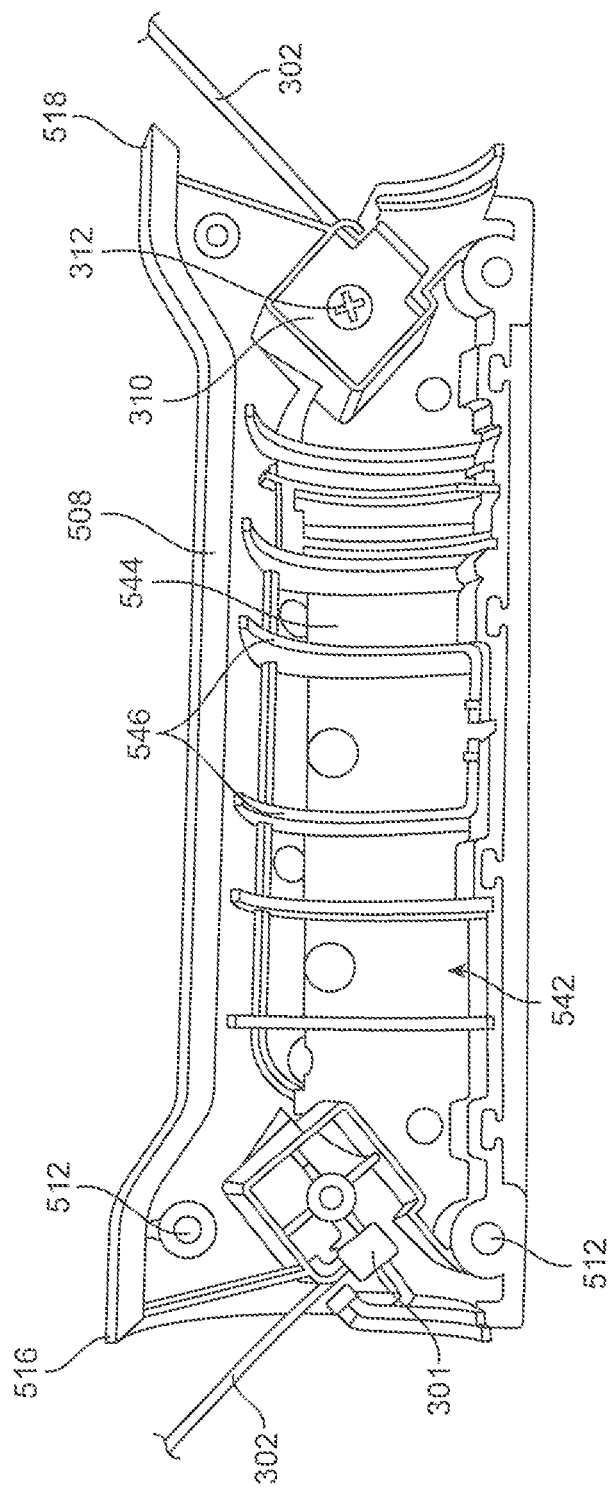
FIG. 17 illustrates an interior view of portion of a housing of a brake actuator, according to an embodiment.

FIG. 17 illustrates a first portion 508 of housing 500, according to an embodiment. In comparison to FIG. 16, the attachment locations for cable couplings 310 to couple cables 302 with housing 500 are disposed at first end 516 and second end 518 of the housing 500. In some embodiments, the attachment locations for cable couplings 310 shown in FIG. 16 can be used with a band brake system and the attachment locations for cable couplings 310 shown in FIG. 17 can be used with a disc brake system. Attaching cable couplings 310 closer to the center of the housing 500, as shown in FIG. 16, can increase the force applied upon rotating the brake actuator 300. As discussed above, band brakes generally require more force to operate than disc brakes. So in some embodiments, attachment locations for cable couplings 310 closer to ends 516, 518 of housing 500, as shown in FIG. 17, can be used with a disc brake system because it requires less force to operate the brakes.

FIG. 18 illustrates brake actuator 300 disposed on a handle bar 200, according to an embodiment. Many of the components are similar to those shown and described with respect to FIGS. 5 and 6, for example, and are indicated by like reference numbers. For example, base member 400 can include a through-hole 420 for handle bar 200, a main body 404 having an outer surface 402, a first collar 406 disposed at a first end 416 of main body 404, and a second collar 408 disposed at a second end 418 of main body 404. In some embodiments, first collar 406 and second collar 408 can have a passage 410 extending therethrough, with an outer opening 412 disposed on an exterior side of the collar and an inner opening 414 on an interior side of the collar.

In some embodiments, passage 410 can include a protrusion (e.g., a nipple) 422 extending from the surface of collars 406, 408. In some embodiments, a first cable 302 can extend through passage 410 of first collar 406 and a second cable 302 can extend through passage 410 of second collar 408, with both cables 302 fixedly attaching to an interior of housing 500. The position and orientation of nipples 422 can dictate the entry angle $\theta_3$ of cable(s) 302, as discussed herein with reference to FIG. 22.

Figure 19:
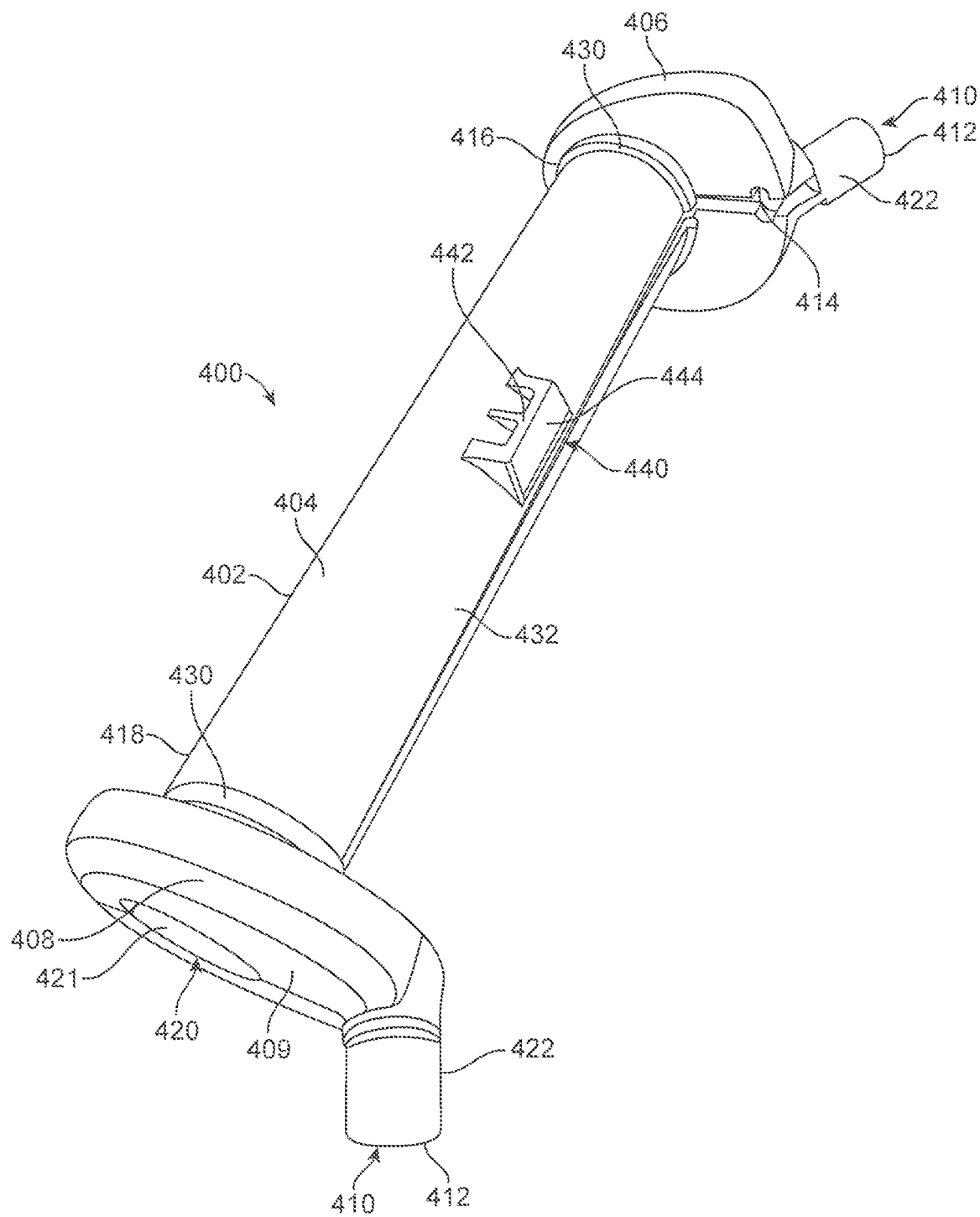
FIG. 19 illustrates a perspective view of a base member of a brake actuator, according to an embodiment.

FIG. 19 illustrates stopper 440 on base member 400, according to an embodiment. Stopper 440 can limit the rotation of brake actuator 300 by acting as an interference surface. In some embodiments, stopper 440 can include a top surface 442 and a front surface 444, each extending from the outer surface 402 of main body 404 of base member 400. In some embodiments, the top surface 4442 and front surface 444 can meet, forming a wedge shape. In some embodiments, the stopper 440 can engage one or more of the ribs 546 on the housing 500 to limit the rotational movement of the housing 500 around the base member 400.

Figure 20:
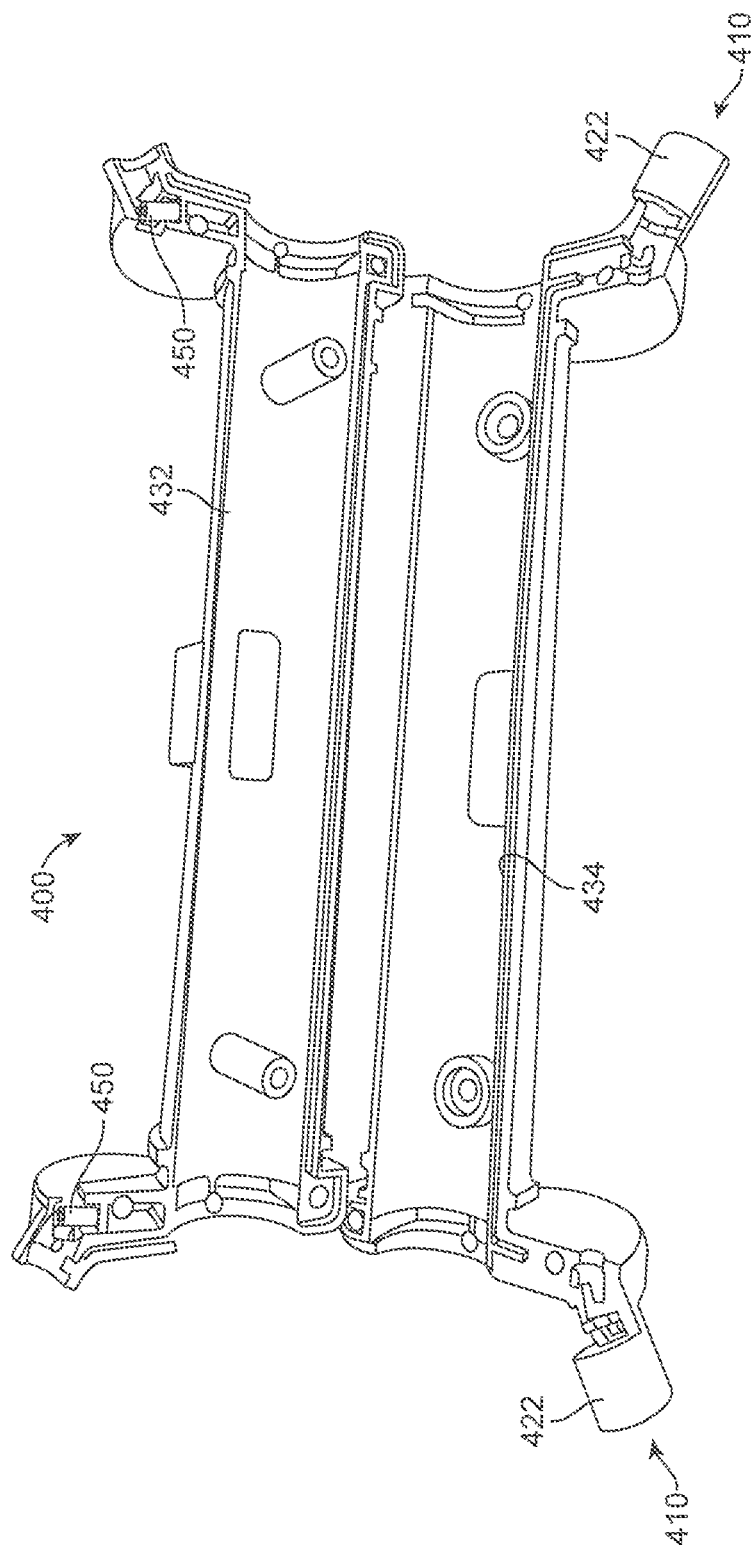
FIG. 20 illustrates an interior view of a decoupled base member of a brake actuator, according to an embodiment.

FIG. 20 illustrates an interior view of base member 400, according to an embodiment. As described above, in some embodiments, base member 400 can have a first portion 432 and a second portion 434 that are coupled together to form base member 400. FIG. 20 illustrates bearing pins 450, which in some embodiments can be disposed in passage 410. Bearing pins 450 can be, for example, metal or plastic pins that can rotate to reduce friction on cable(s) 302 as the cable moves upon rotating the brake actuator 300. For example, when rotating brake actuator 300 to actuate the braking systems 105, cable(s) 302 travel a distance to wrap around and along base member 400. The bearing pins 450 reduce the friction imparted onto the cable(s) 302, for example, by the interior surface of the nipples 422.

Figure 21:
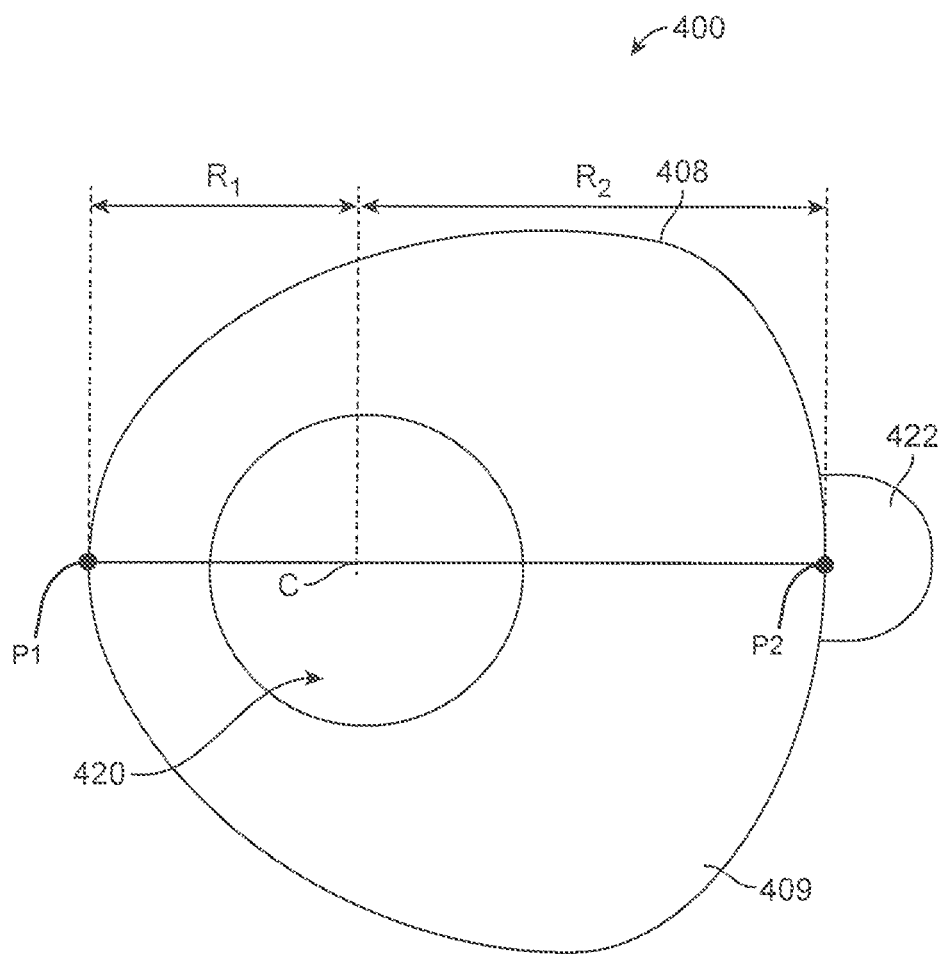
FIG. 21 illustrates a side view of a brake actuator, according to an embodiment.

FIG. 21 illustrates a side view of a brake actuator 300, according to an embodiment. The side view shows side surface 409 of second collar 408 of base member 400, with through-hole 420 extending through base member 400. Through-hole 420 can have a central axis C. FIG. 21 illustrates a non-circular shape of brake actuator 300 about central axis C, according to some embodiments of brake actuator 300. In some embodiments, this non-circular shape can result from the collars 406, 408 having an oblong shape such that a first portion (for example near P1) has a smaller radius of curvature than a second portion (for example near P2). The non-circular shape creates an ergonomically designed brake actuator that provides a better grip to user and also provides space for the cables within the housing 500 of the brake actuator 300. The wider section allows the cable to remain internal and protects the user's hands from an external cable.

In some embodiments, a first radius R1 from the central axis C to a first point P1 on an outer surface of the rotatable brake actuator 300 (e.g., on outer surface 502 of housing 500) is smaller than a second radius R2 from the central axis C to a second point P2 on the outer surface of the rotatable brake actuator 300. In some embodiments, the first radius R1 and the second radius R2 can be collinear. In some embodiments, P1 can define the rear-most point of brake actuator 300 and P2 can define the forward-most point of brake actuator 300. In some embodiments, the first point P1 is configured to be gripped by a palm of a user and the second point P2 is configured to be gripped by one or more fingers of the user. This design provides the user with a comfortable handle at the palm location, while also providing a finger grip area for the tips of the fingers. As described above, including ridges 506 on gripping portions 504, for example, made of a rubber material, also adds to the ergonomics and feel of the brake actuator 300.

Figure 22:
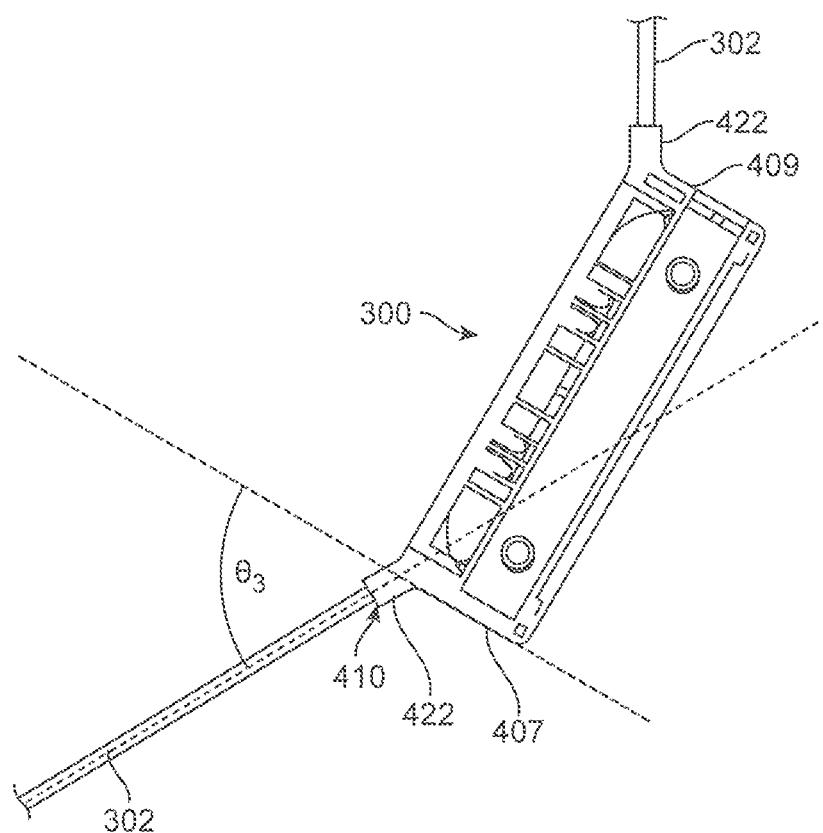
FIG. 22 illustrates a schematic of a brake actuator, according to an embodiment.

FIG. 22 illustrates a schematic of brake actuator 300, according to an embodiment, which depicts the entry angle $\theta_3$ of the cables 302 relative to the brake actuator 300. As shown in FIG. 22, the cables 302 can extend into the brake actuator 300, for example through passages 410 and/or nipples 422. FIG. 22 illustrates entry angle $\theta_3$ formed between a plane at side surface 407 of first collar 406 and a plane through a lengthwise direction of cable 302. For example, as discussed above, the entry angle $\theta_3$ may be between 5 and 80 degrees depending on the type of braking system and required force output to operate the braking system.

Figure 23:
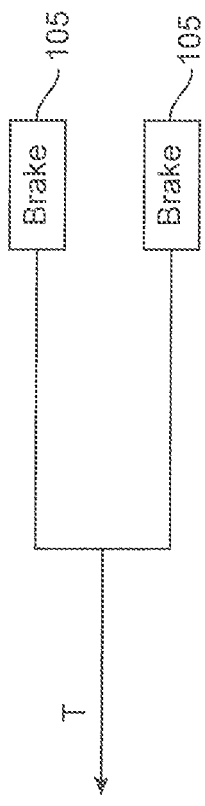
FIG. 23 illustrates a force schematic of a conventional brake system, according to an embodiment.
Figure 24:
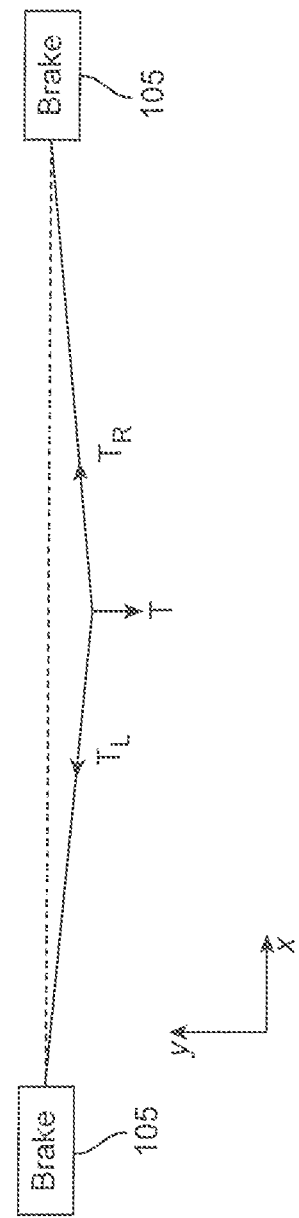
FIG. 24 illustrates a force schematic of a brake system of the present disclosure, according to an embodiment.

FIG. 23 illustrates a force schematic of a conventional cabled brake system and FIG. 24 illustrates a force schematic of a brake system as described herein, according to an embodiment. As shown in FIG. 23, conventional cabled brake systems impart a linear tension force T in the x-direction of the cable(s), which pulls the cable at brakes 105 in the same direction as the linear tension force T. The cable is pulled in only one direction and so there is only one force component, which is along the axis of the cable. This differs from FIG. 24, where the tension force T is applied in a y-direction perpendicular to the direction of the cable(s), imparting a tension force $T_L$ to a left brake 105 and a tension force $T_R$ to a right brake. The angled deflection of the cables increases the tension in the cable, thus requiring less force to be exerted by the user to achieve the same travel distance of the cables and the same braking force at the wheel(s) as the conventional system.

Methods of activating a braking system of a transport carrier are also disclosed. For example, a method of activating a braking system of a child transport carrier can include rotating the braking actuator about the handle bar of the carrier. In some embodiments, rotating the braking actuator can displace a cable that is disposed through braking actuator, for example, through the first passage of the first collar, the cavity. This rotation can cause the cable to move from a first position to a second position, thereby imparting force along the cable to activate a first and second brake of respective first and second wheels disposed on opposite sides of the carrier. In some embodiments, the method can include rotating the braking actuator toward the user. In some embodiments, the method can include rotating the braking actuator with one hand by the user. In some embodiments the method can include rotating the braking actuator more than 20 degrees. In some embodiments the method can include rotating the braking actuator more than 30 degrees. In some embodiments the method can include rotating the braking actuator more than 40 degrees. In some embodiments the method can include rotating the braking actuator about 45 degrees.

In some embodiments, a method of activating a braking system of a child transport carrier can include rotating the braking actuator about the handle bar of the carrier. In some embodiments, a housing of the braking actuator can rotate about a base member of the braking actuator. In some embodiments, rotating the braking actuator can displace one or more cables coupled to the braking actuator. In some embodiments, two cables can be coupled the braking actuator, for example, within a housing of the braking actuator. This rotation can cause the cables to travel around and along the handle bar, thereby imparting force along the cables, which in some embodiments activate a first and second brake of respective first and second wheels disposed on opposite sides of the carrier. In some embodiments, the method can include rotating the braking actuator toward the user. In some embodiments, the method can include rotating the braking actuator with one hand by the user. In some embodiments the method can include rotating the braking actuator more than 20 degrees. In some embodiments the method can include rotating the braking actuator more than 60 degrees. In some embodiments the method can include imparting a cable travel distance of more than 15 mm.

It is to be appreciated that the Detailed Description section, and not the Brief Summary and Abstract sections, is intended to be used to interpret the claims. The Summary and Abstract sections may set forth one or more but not all exemplary embodiments of passenger transport carriers and brake actuators as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A child transport carrier, comprising:
a handle bar; and
a rotatable brake actuator disposed around the handle bar and comprising a first portion having a first radius of curvature and a second portion having a second radius of curvature, wherein the first radius of curvature is less than the second radius of curvature,
wherein rotating the rotatable brake actuator around the handle bar activates a first wheel brake.

2. The carrier of claim 1, wherein rotating the rotatable brake actuator requires less than 3 Nm of torque to activate the first wheel brake.

3. The carrier of claim 1, wherein the first wheel brake is activated by rotating the rotatable brake actuator less than 45 degrees about the handle bar.

4. The carrier of claim 1, further comprising a first cable, wherein a portion of the first cable is disposed internally within the rotatable brake actuator.

5. The carrier of claim 4, wherein:
a tension force is applied perpendicular to a direction of the first cable within the rotatable brake actuator; and
the tension force is imparted to the first wheel brake and a second wheel brake.

6. The carrier of claim 1, wherein:
the first portion is disposed toward a user and defines a rear-most point of the rotatable brake actuator; and
the second portion is disposed away from the user and defines a forward-most point of the rotatable brake actuator.

7. The carrier of claim 1, wherein the first radius of curvature and the second radius of curvature are collinear.

8. The carrier of claim 1, wherein an outer surface of the rotatable brake actuator comprises a gripping portion comprising a plurality of ridges.

9. The carrier of claim 1, wherein:
the first portion comprises a first gripping portion comprising a first ridge protruding from the first gripping portion and configured to contact a user's palm; and
the second portion comprises a second gripping portion comprising a second ridge protruding from the second gripping portion and configured to contact a user's fingertip.

10. A child transport carrier, comprising:
a handle bar;
a rotatable brake actuator disposed around a lengthwise axis of the handle bar;
a first cable coupled to the rotatable brake actuator, the first cable having a first end and a second end; and
a first wheel brake of a first wheel coupled to the first end of the first cable,
wherein a range of rotation of the rotatable brake actuator and a range of travel of the first cable are proportionally related to provide a force along the first cable to activate the first wheel brake, and
wherein the second end of the first cable is disposed exterior to the handle bar.

11. The carrier of claim 10, wherein:
the range of rotation of the rotatable brake actuator is between 30 and 115 degrees relative to the lengthwise axis; and
the range of travel of the first cable is between 5 and 50 mm.

12. The carrier of claim 11, wherein:
the range of rotation of the rotatable brake actuator is between 60 and 85 degrees relative to the lengthwise axis; and
the range of travel of the first cable is between 15 and 30 mm.

13. The carrier of claim 10, wherein the range of travel of the first cable is increased by moving the second end of the first cable axially outward from a center of the handle bar.

14. A child transport carrier, comprising:
a handle bar;
a rotatable brake actuator disposed around the handle bar and comprising a housing; and
a cable coupled to the rotatable brake actuator,
wherein the housing comprises a ledge configured to create a pre-load angle for the cable, and
wherein the ledge is disposed exterior to the handle bar.

15. The carrier of claim 14, wherein the ledge is disposed within a cavity of the housing and a wall is disposed between the cavity and the handle bar.

16. The carrier of claim 14, wherein the ledge comprises a notch and the cable is disposed within the notch.

17. The carrier of claim 14, wherein the pre-load angle is between 5 and 30 degrees.

18. The carrier of claim 17, wherein the pre-load angle is between 15 and 20 degrees.

19. The carrier of claim 14, wherein the cable is positioned a distance from a center point of a central axis of the handle bar.

20. The carrier of claim 19, wherein the distance from the center point of the central axis is between 20 mm and 30 mm.

* * * * *